Jan. 14, 1964　　　W. G. HOELSCHER ETAL　　　3,117,658
HYDRAULICALLY OPERATED TRANSMISSION SYSTEM
Filed March 7, 1961　　　　　　　　　　　　22 Sheets-Sheet 1

INVENTORS
William G. Hoelscher,
BY Clifford L. Schulte,
Knowlson G. Byar
Wood, Herron & Evans,
ATTORNEYS.

Jan. 14, 1964  W. G. HOELSCHER ETAL  3,117,658
HYDRAULICALLY OPERATED TRANSMISSION SYSTEM
Filed March 7, 1961  22 Sheets-Sheet 5

INVENTORS.
William G. Hoelscher
BY Clifford L. Schulte
Knowlton G. Byar
Wood, Herron & Evans
ATTORNEYS.

Jan. 14, 1964  W. G. HOELSCHER ETAL  3,117,658
HYDRAULICALLY OPERATED TRANSMISSION SYSTEM
Filed March 7, 1961  22 Sheets-Sheet 6

INVENTORS,
William G. Hoelscher.
BY Clifford L. Schulte.
Knowlson G. Byar.
Wood, Herron & Evans.
ATTORNEYS.

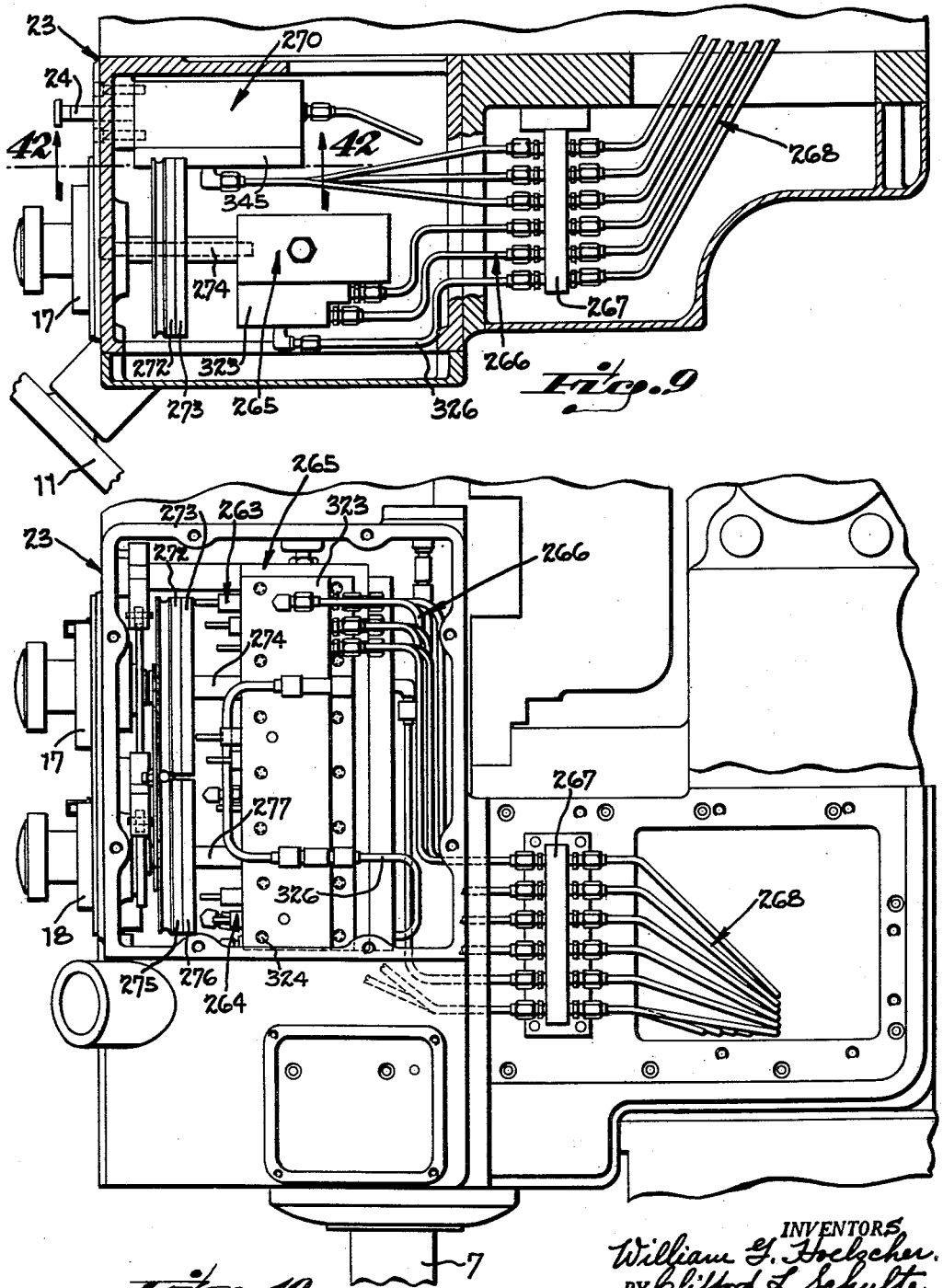

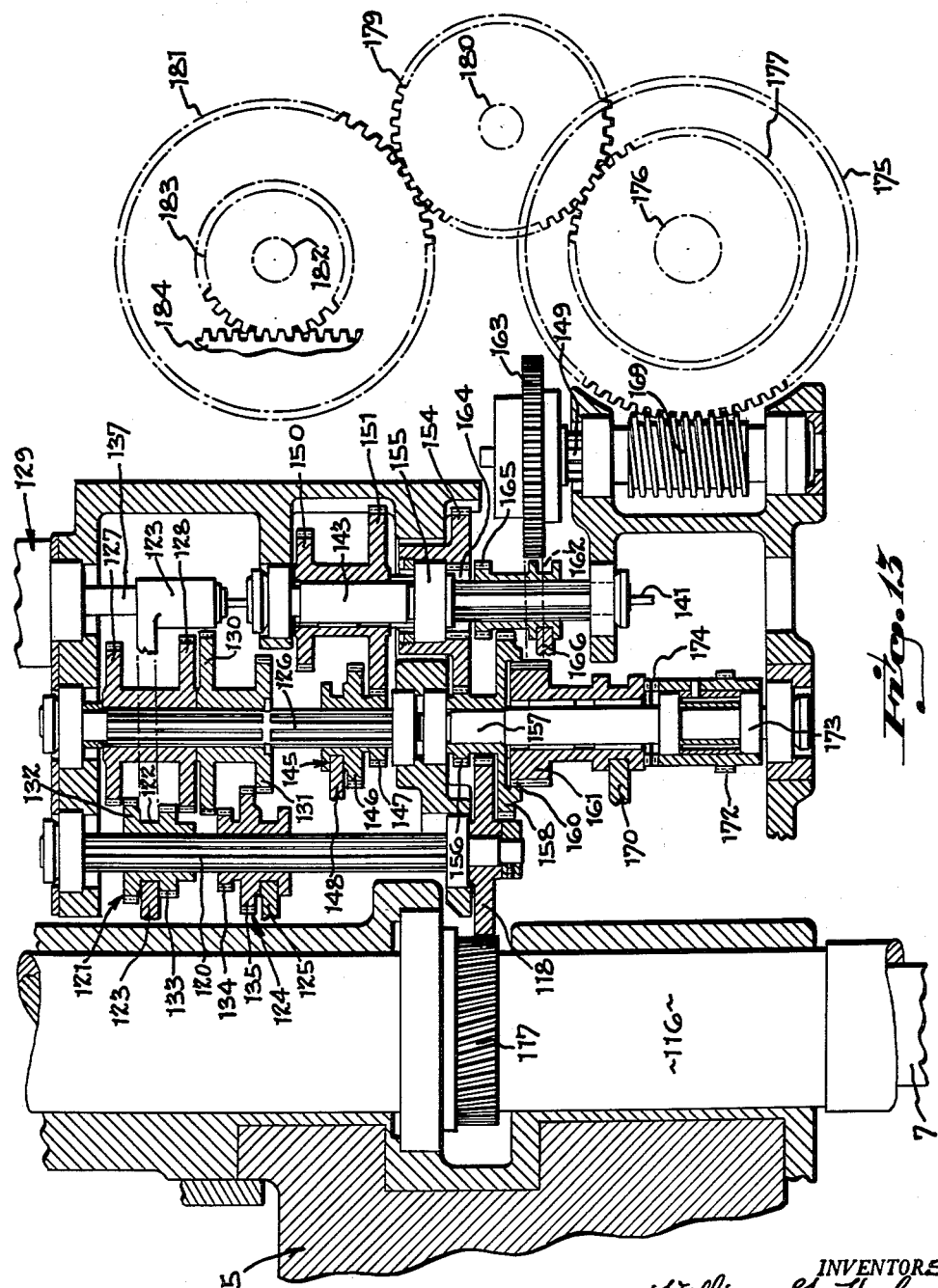

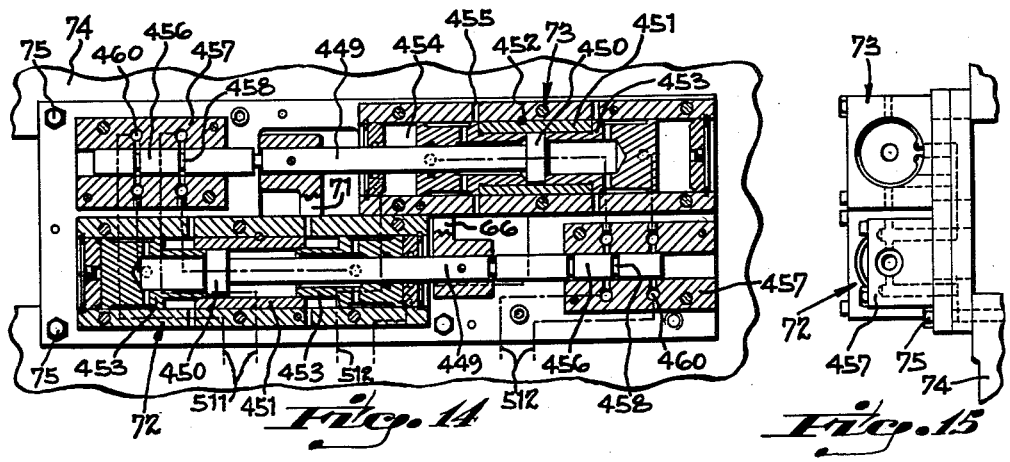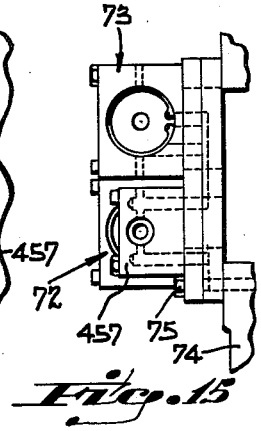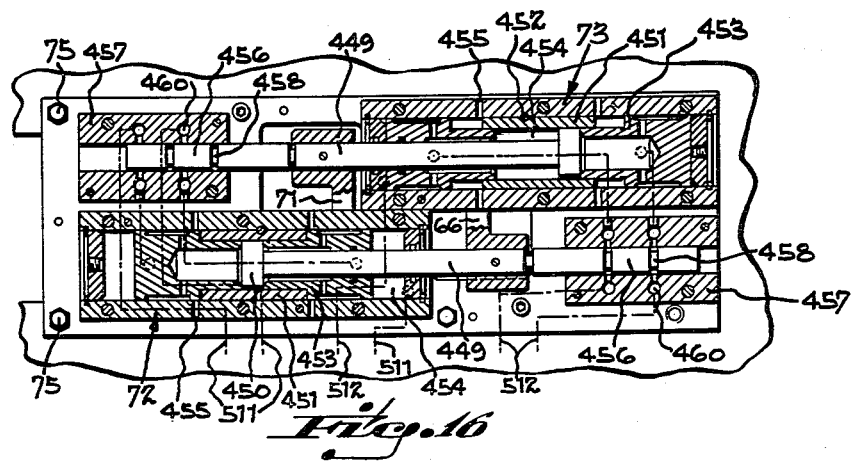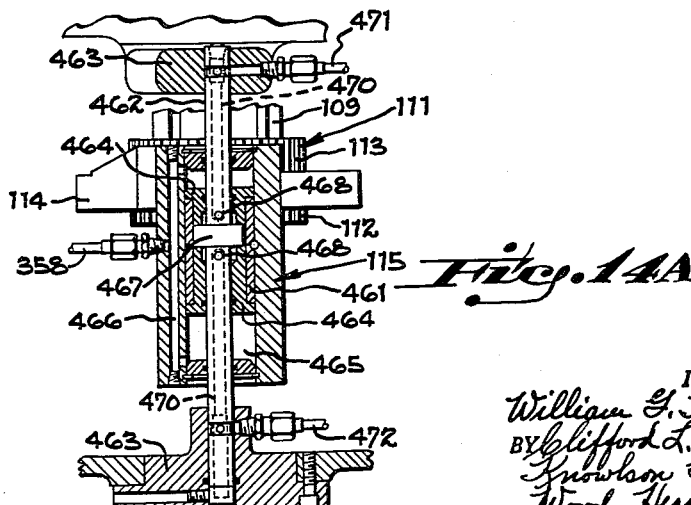

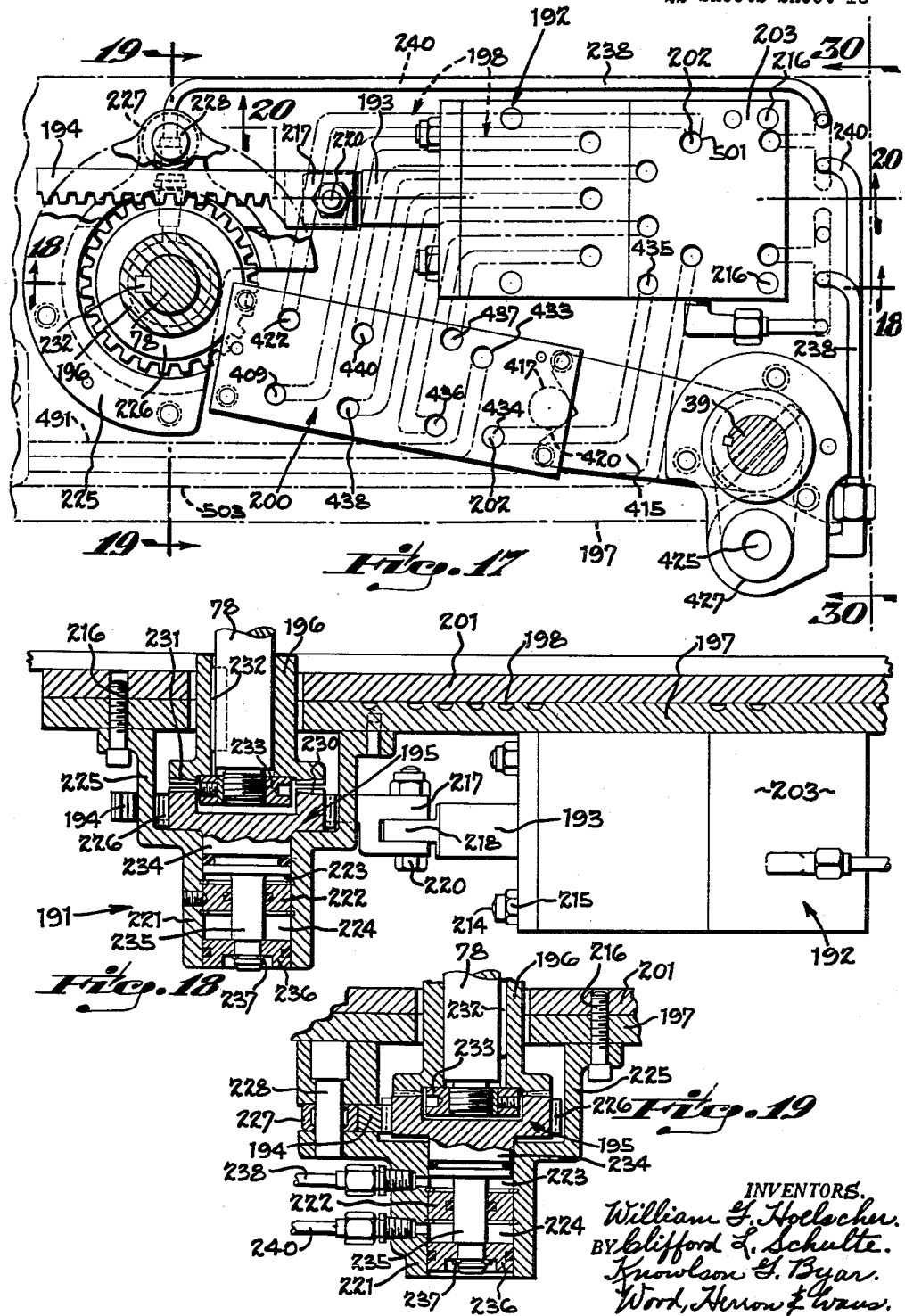

Jan. 14, 1964　　W. G. HOELSCHER ETAL　　3,117,658
HYDRAULICALLY OPERATED TRANSMISSION SYSTEM
Filed March 7, 1961　　22 Sheets-Sheet 14
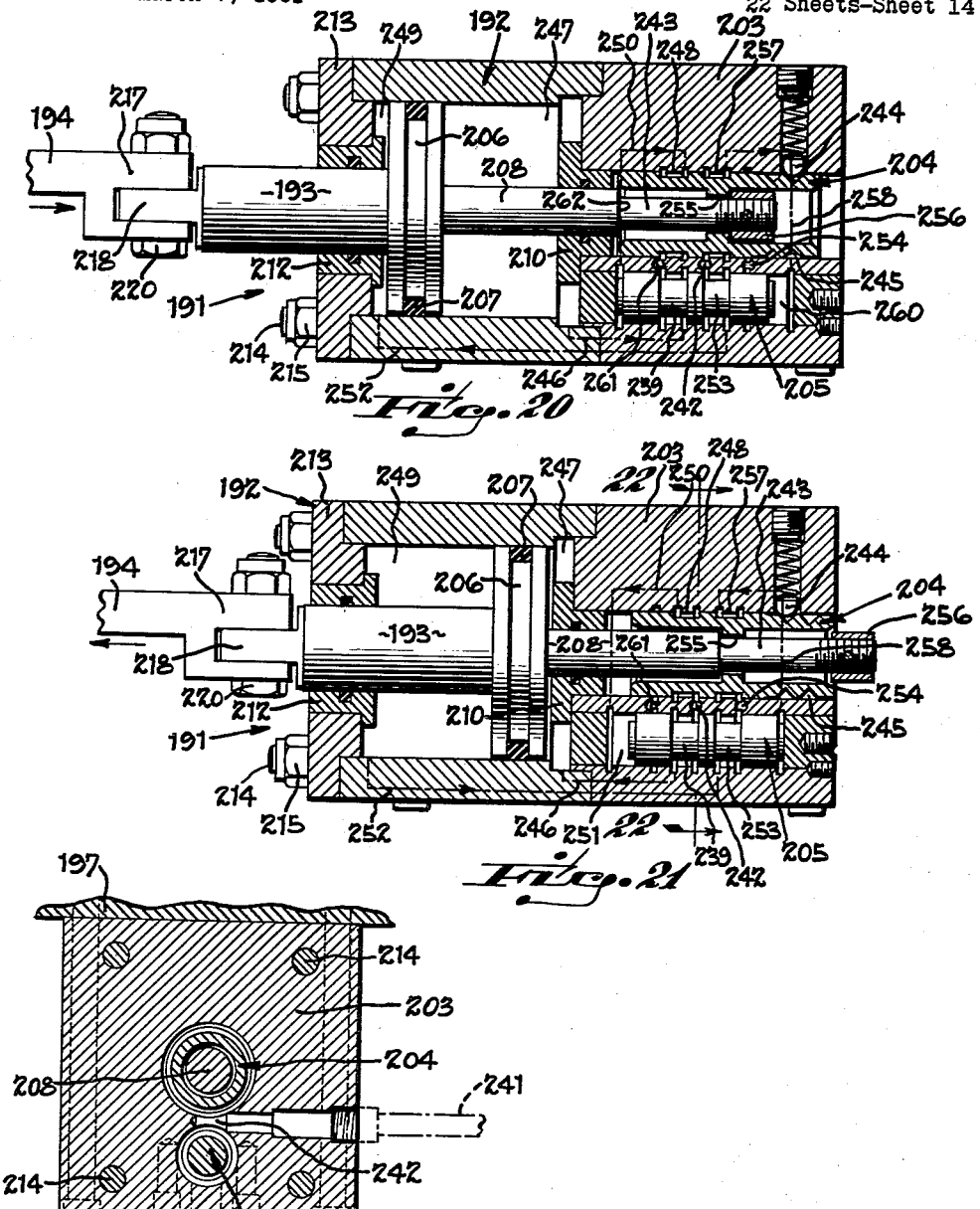
INVENTORS,
William G. Hoelscher,
BY Clifford L. Schulte,
Knowlson G. Byar.
Wood, Herron & Evans.
ATTORNEYS.

Jan. 14, 1964  W. G. HOELSCHER ETAL  3,117,658
HYDRAULICALLY OPERATED TRANSMISSION SYSTEM
Filed March 7, 1961  22 Sheets-Sheet 15
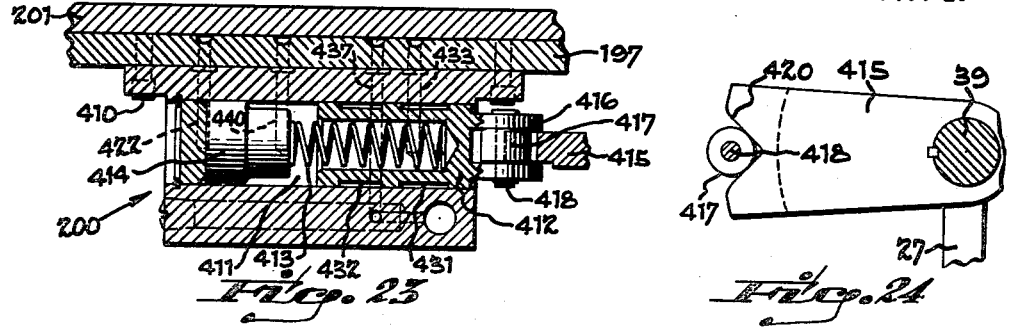
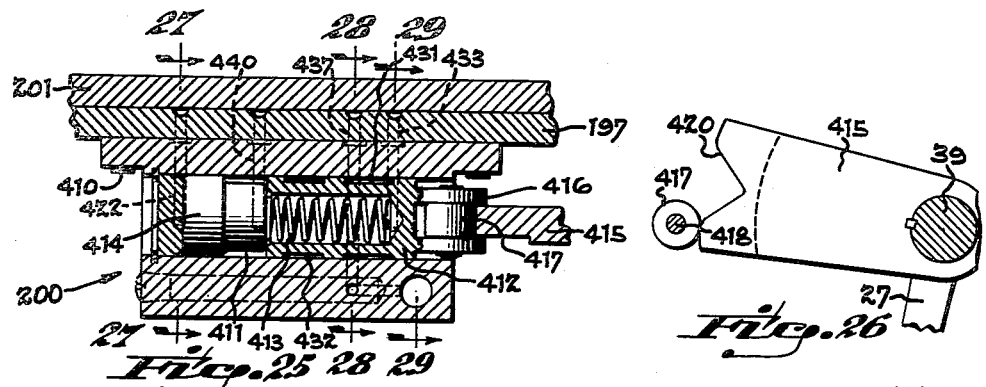
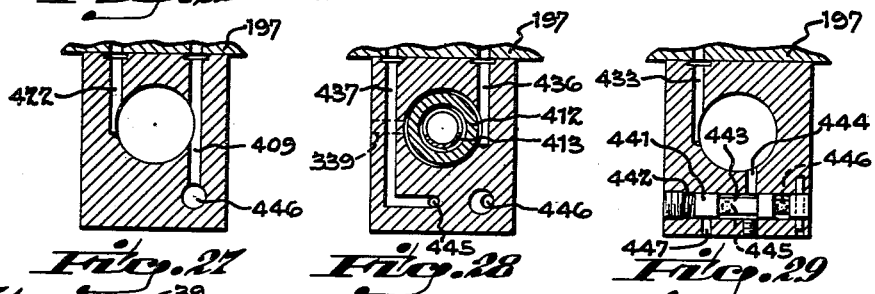
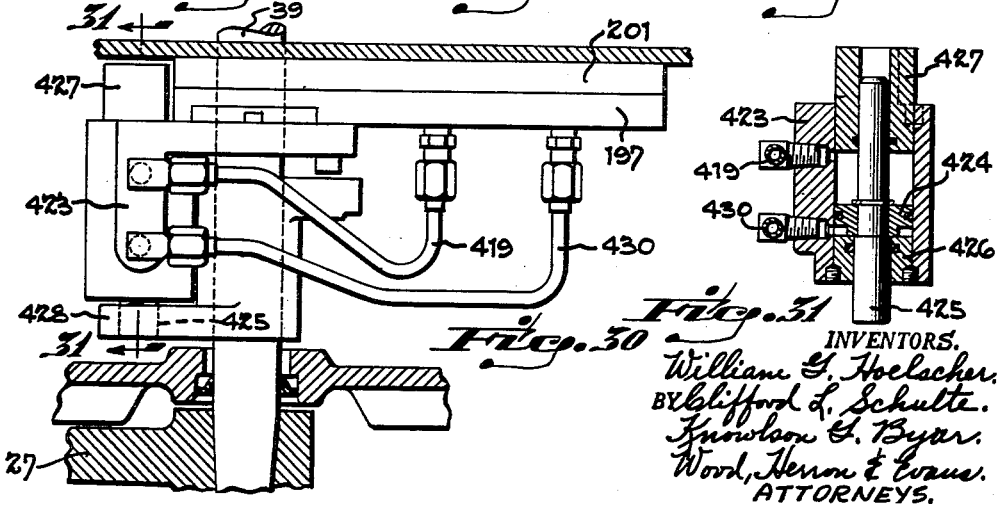
INVENTORS.
William G. Hoelscher,
BY Clifford L. Schulte,
Knowlson G. Byar.
Wood, Herron & Evans.
ATTORNEYS.

Jan. 14, 1964  W. G. HOELSCHER ETAL  3,117,658
HYDRAULICALLY OPERATED TRANSMISSION SYSTEM
Filed March 7, 1961  22 Sheets-Sheet 16

INVENTORS.
William G. Hoelscher
BY Clifford L. Schulte.
Knowlson G. Byar.
Wood, Herron & Evans.
ATTORNEYS.

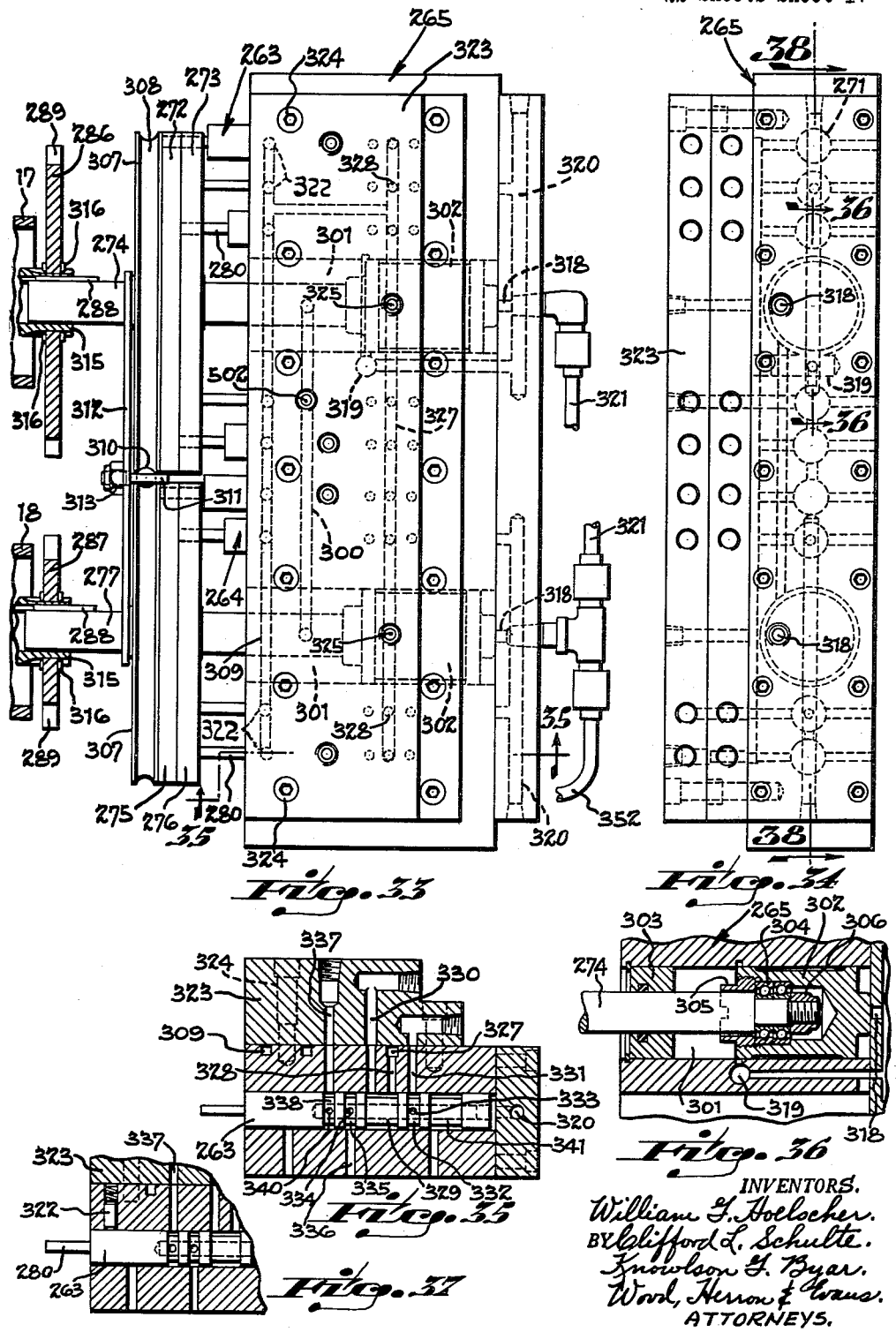

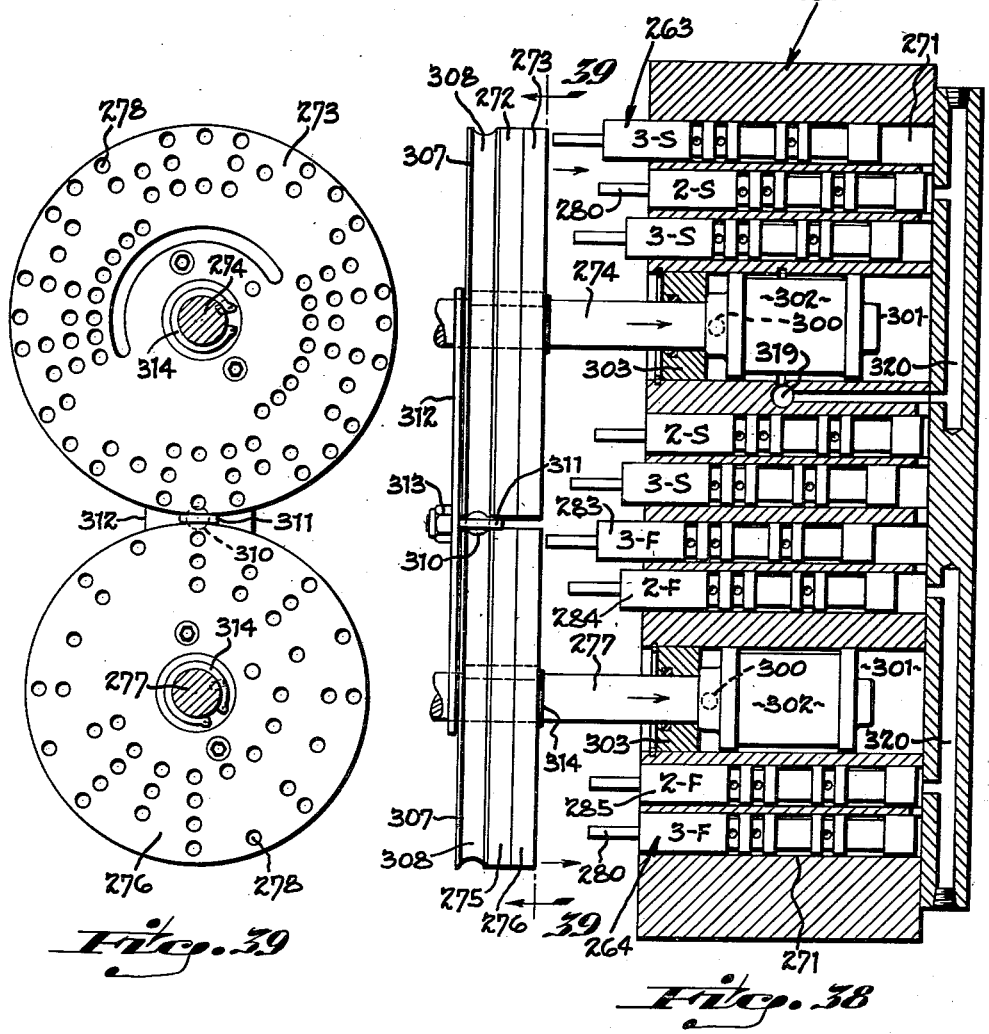

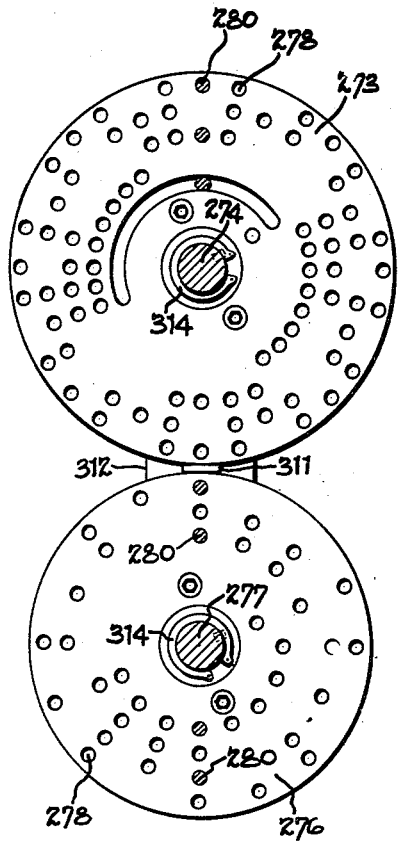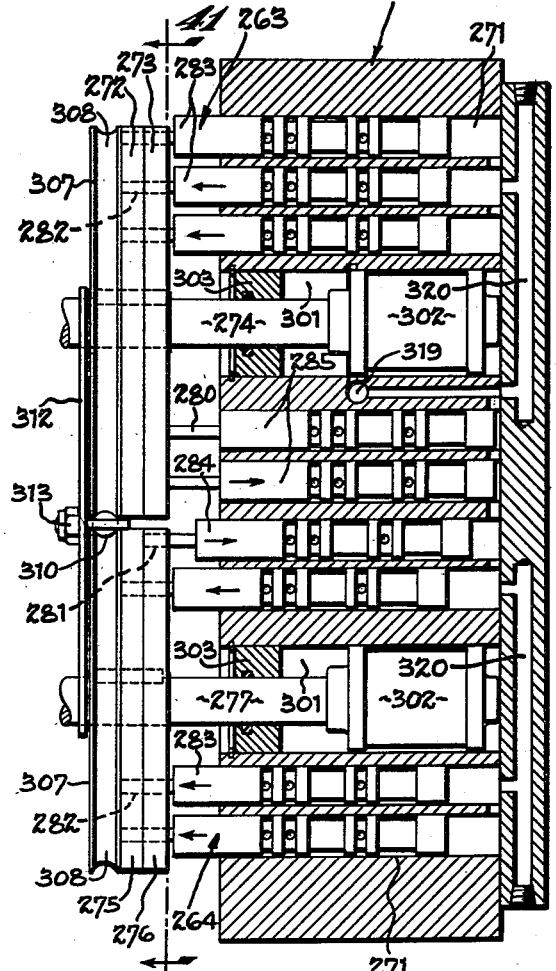

Jan. 14, 1964  W. G. HOELSCHER ETAL  3,117,658
HYDRAULICALLY OPERATED TRANSMISSION SYSTEM
Filed March 7, 1961  22 Sheets-Sheet 20

INVENTORS.
William G. Hoelscher.
BY Clifford L. Schulte.
Knowlson G. Byar.
Wood, Herron & Evans.
ATTORNEYS.

Jan. 14, 1964 W. G. HOELSCHER ETAL 3,117,658
HYDRAULICALLY OPERATED TRANSMISSION SYSTEM
Filed March 7, 1961 22 Sheets-Sheet 21
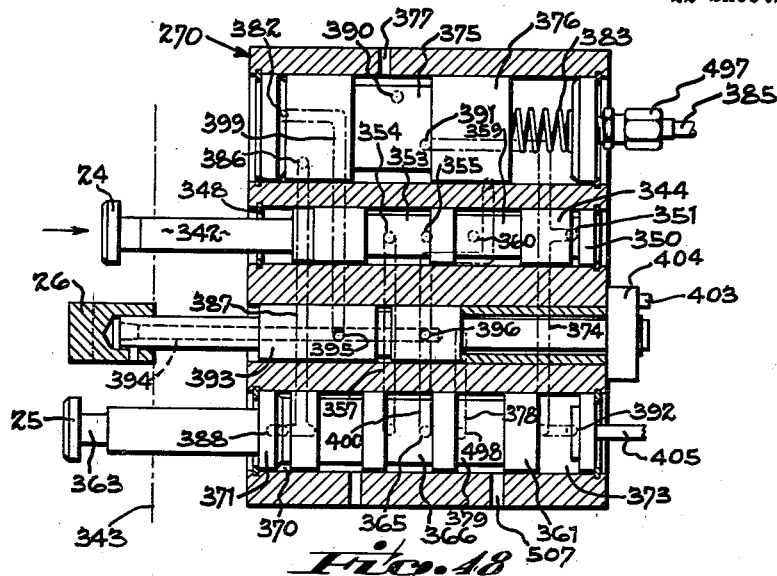
Fig. 48
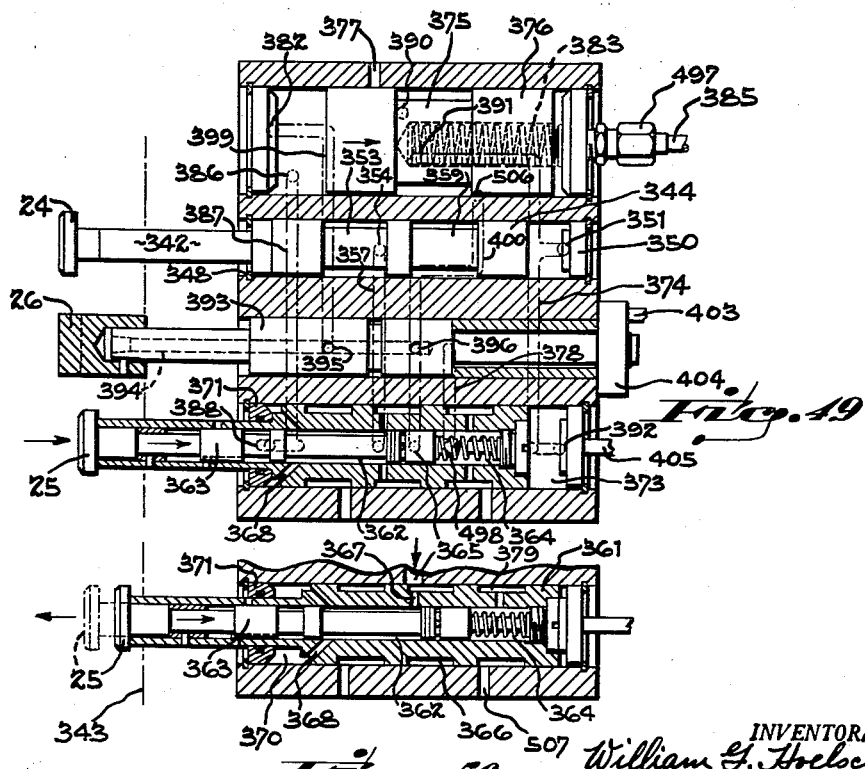
Fig. 49
Fig. 50
INVENTORS,
William G. Hoelscher,
BY Clifford L. Schulte.
Knowlson G. Byar.
Wood, Herron & Evans.
ATTORNEYS.

United States Patent Office 3,117,658
Patented Jan. 14, 1964

3,117,658
HYDRAULICALLY OPERATED TRANSMISSION SYSTEM
William G. Hoelscher and Knowlson G. Byar, Cincinnati, Ohio, and Clifford L. Schulte, Bell, Calif. (6475 Atlantic Ave., North Long Beach 5, Calif.); said Byar and said Hoelscher assignors to The American Tool Works Company, Cincinnati, Ohio, a corporation of Ohio
Filed Mar. 7, 1961, Ser. No. 169,156
(Filed under Rule 47(a) and 35 U.S.C. 116)
28 Claims. (Cl. 192—4)

This invention relates to transmission systems of the preselecting type for regulating the speed and feed rates of a machine tool, and is directed more particularly to a hydraulic system wherein the transmission system is regulated by manual operation of direct reading selector dials.

One of the primary objectives of the present invention has been to provide a hydraulic control system of simplified design which allows the operator to select the speed and feed rates while the machine tool is in operation, and which shifts the transmission system to the preselected speed and feed rates at the end of a current machining operation when the spindle is braked to a stop, thereby to bring about a saving in time and effort involved in operating the machine.

The present invention is disclosed in relation to a radial drill in order to disclose the principles of the invention; however, it will be understood that the transmission system may be utilized with lathes and various other types of machines which involve the preselection of speed rates or feed rates, or a combination of both. As applied to a radial drill, the hydraulic control system regulates the rate of spindle rotation in terms of revolutions per minute and also the rate of axial spindle feed in terms of thousandths of an inch per revolution of the spindle at the selected rate of rotation.

Described generally, the radial drill spindle is mounted for rotary and axial motion in a drill head, which is shiftably mounted upon the arm of the radial drill. The arm in turn, is slidably mounted upon a column rising from a base and is adapted to be adjusted vertically so as to raise or lower the drill head and spindle with respect to the workpiece which is mounted upon the base. The arm is also adapted to be shifted radially about the axis of the column and the drill head is adapted to be shifted horizontally along the arm so as to center the spindle and its cutting tool with respect to the hole center which is to be machined in the workpiece.

During the drilling or other machining operation, the arm is clamped to the column, the drill head is clamped to the arm and the spindle and its cutting tool are rotated at the selected speed rate and fed axially relative to the head at the selected feed rate. The hydraulically controlled transmission is provided with mechanical clutching devices interconnected with a manual control lever, the arrangement being such that the spindle may be rotated and fed in a forward or reverse direction by shifting the lever in either direction from a neutral or braking position. This lever is interconnected with the hydraulic control system and is arranged to brake the spindle to a stop and to initiate a gear shifting cycle in accordance with the preselected settings of the speed and feed control dials at the end of each machining operation when the control lever is shifted to its neutral or braking position.

Another objective of the present invention has been to provide a dial-operated speed and feed selector valve including rotatable cam plates having hole patterns which register with axially shiftable valve spools and which present abutment surfaces engageable with the spools, the cam plates and valve spools being shifted relative to one another, causing the valve spools to be shifted by the cam plates axially to preselected positions, thereby to shift selected speed change gears in accordance with the dial-selected speed and feed rates.

According to this aspect of the invention, the speed and feed change transmission includes gear clusters which are shifted to either two or three positions, the hydraulic system having two-position cylinders and three-position cylinders connected to the respective clusters for shifting them in various combinations to provide the desired speed and feed rates, each cylinder being actuated by one of the valve spools in accordance with the axial position of the spool. The axially shiftable valve spools are slidably mounted in a valve block and each includes an outwardly projecting stem which registers with the hole pattern of the associated rotatable cam plate, the valve spools being shifted to two or three positions corresponding to the two or three position cylinders to which they are connected. During a given machining operation, the cam plates are shifted outwardly with respect to the stems of the valve spools, adapting the speed and feed selector dials and associated cam plates to be rotated freely to a selected speed and feed setting while the spindle is being rotated and fed at a previously selected speed and feed rate. At the end of a prevailing machine operation, the manual selector lever is shifted to the braking position to stop the spindle, thereby initiating a shifting cycle, as explained later.

A further objective of the invention has been to provide a hydraulic reciprocator mechanism which oscillates or rocks the gear trains of the speed and feed transmission system prior to and during the shifting cycle, adapting the gears to be shifted into meshing relationship in a positive manner and without interference between mating gear teeth, thereby to prevent clashing and damage to the teeth.

In general, the reciprocator comprises a hydraulic cylinder mechanically interconnected with a reversing valve, the valve being adapted to provide sustained reciprocation of the piston so long as hydraulic pressure is supplied. The piston includes a rack meshing with a pinion having a hydraulically operated coupling element which shifts the pinion into driving engagement with the transmission system during the shifting cycle. As noted above, the shifting cycle is initiated when the manual control lever is shifted to its neutral or braking position at the end of the given machine operation. At this time, hydraulic fluid is supplied to the reciprocator valve to operate the piston and the coupling element of the reciprocator is shifted hydraulically to its coupling position, such that the gear trains are oscillated during the shifting cycle. After the shifting cycle is completed, the coupling element is hydraulically shifted to an uncoupled position, whereby power may be applied to the transmission to drive the spindle at the preselected speed and feed rates.

According to another aspect of the invention, the hydraulic system is arranged to provide either automatic or push button shifting in accordance with the position of a manually controlled selector knob. When set for automatic operation, the hydraulic system carries out a sequence of operations each time the manual lever is shifted to its neutral or braking position during operation of a hydraulic timer or delay apparatus. Briefly, under automatic operation, the spindle is braked to a stop when the manual lever is shifted to the neutral position or braking position, the lever is temporarily latched to neutral, and the selector dials are hydraulically locked in their selected positions. After stopping the spindle, the brake is released, the reciprocator mechanism is commissioned to rock the gear trains, and the cam plates and valve spools are shifted toward one another so as to shift the spools axially for the selected speed and feed rates. Thereafter, hydraulic fluid is advanced through the valve spools to the shifter cylinders to shift the selected gears into meshing relationship. After the gears are shifted, the reciprocator is uncoupled from the transmission and the dials and manual levers are unlocked. The machine is now ready for the operation, the spindle being driven at the newly selected speed and feed rates when the lever is shifted manually from neutral for forward or reverse spindle rotation.

In order to provide manual control of the shifting cycle, the rotary selector knob, noted above, is rotated to its second position, wherein the gears are shifted in response to manual operation of a push button which is mounted adjacent the selector knob. Manual shifting under push button control is desirable in setting up the machine, in making trial cuts, or in tapping operations because the spindle may be driven in forward or reverse direction without initiating the gear shifting cycle, thus saving the time normally consumed during the shifting cycle. On the other hand, the operator may select a new speed or feed rate with the dials when the lever is in its neutral position with the spindle stopped. Upon depressing the shift button, the reciprocator is activated and the apparatus advances through the shifting cycle, as outlined above. The operator may then shift the manual lever to rotate the spindle in the selected speed and feed.

In order to reduce the effort of depressing the gear shift push button which controls the flow streams of high pressure fluid, the push button valve is arranged to take advantage of the fluid pressure to provide a servo-action. For this purpose, the valve comprises a control spool which is actuated by the push button and which is depressed with very little effort. The control spool, in turn, hydraulically shifts a main spool which surrounds the control spool; the main spool regulates the flow of hydraulic pressure to initiate the shifting cycle.

The hydraulic system includes a second push button which may be depressed to uncouple the spindle from the transmission system, thereby providing free spindle rotation. This is highly desirable when changing tools, since the spindle may be turned manually to facilitate chucking the tool and to facilitate dislodgment of the tool from the chuck.

In order to protect the apparatus, the hydraulic system includes automatic interlocks associated with the manually operated controls. Thus, when either manual shift push button or the free spindle push button is depressed, a hydraulic interlock holds the manual lever in its neutral position until the shift is completed. On the other hand, when the manual lever is shifted in either direction from its neutral position for spindle drive, then the free spindle push button and gear shift push button are both locked out hydraulically to prevent shifting while the machine is running. The speed and feed selector dials are also provided with hydraulically actuated interlocks which hold the dials rigidly in the selected position during the shifting cycle, as noted earlier.

The several components of the hydraulic system are all mounted within the drill head and the system includes manifold plates which supply fluid pressure to the various valve ports and passageways, greatly reducing the number of conduits and simplifying the installation and maintenance. The hydraulic system utilizes oil, which also acts as a lubricant for the transmission system within the drill head. This further simplifies the hydraulic system since the oil which is exhausted from the valves and cylinders simply flows by gravity back to a sump within the drill head without requiring exhaust conduits.

The various features and advantages of the invention will be more fully apparent to those skilled in the art form the following detailed description taken in conjunction with the drawings.

In the drawings:

FIGURE 9 is a sectional view taken along line 9—9 of FIGURE 3, illustrating the selector valve and associated parts of the hydraulic system within the drill head.

FIGURE 10 is a side view of the selector valve and dials, as viewed along the line 10—10 of FIGURE 2.

FIGURE 13 is a fragmentary sectional view taken along line 13—13 of FIGURE 6, illustrating a portion of the spindle feed transmission.

FIGURE 14 is a sectional view taken along line 14—14 of FIGURE 4, illustrating the three-position hydraulic shifter cylinders of the speed change transmissions.

FIGURE 14A is a sectional view taken along line 14A—14A of FIGURE 6, illustrating the floating, three-position cylinder which provides free spindle rotation and the high and low spindle speed range at the output end of the spindle speed change transmission.

FIGURE 15 is an end view of the cylinder structure as projected from FIGURE 14.

FIGURE 16 is a sectional view similar to FIGURE 14, showing the parts shifted to a second position.

FIGURE 17 is a sectional view taken along line 17—17 of FIGURE 5, illustrating the start and stop valve and reciprocator mechanism.

FIGURE 18 is a sectional view taken along line 18—18 of FIGURE 17, further illustrating the reciprocator mechanism.

FIGURE 19 is a sectional view taken along line 19—19 of FIGURE 17, showing the hydraulic reciprocator clutch in its engaged position.

FIGURE 20 is a sectional view taken along line 20—20 of FIGURE 17, detailing the reciprocator cylinder and valve structure.

FIGURE 21 is a view similar to FIGURE 20, showing the reciprocating cylinder and valve in a second position.

FIGURE 22 is a sectional view taken along line 22—22 of FIGURE 21, further illustrating the valving system of the reciprocator motor.

FIGURE 23 is a sectional view taken along line 23—23 of FIGURE 12, illustrating the start stop valve which initiates the gear shifting cycle when the main control lever is shifted to a position to stop the spindle. The valve is shown with the main control lever shifted to the neutral or spindle braking position.

FIGURE 24 is a fragmentary sectional view taken from

Figure 12:
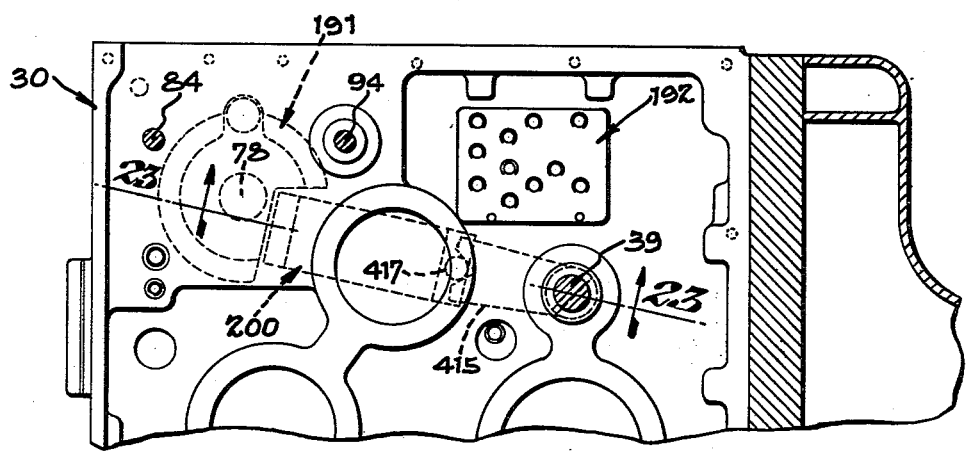
FIGURE 12 is a fragmentary view taken along line 12—12 of FIGURE 5, illustrating the interconnection between the starting lever and the hydraulic start and stop valve, whereby the preselected gears are shifted when the spindle is stopped after a given operation.

FIGURE 12 and illustrating the position of the valve shifter and manual control lever in the neutral position, corresponding to the valve position of FIGURE 23.

FIGURE 25 is a sectional view similar to FIGURE 23 showing the valve shifted to its second position.

FIGURE 26 is a view similar to FIGURE 24, showing the main control lever and valve actuator shifted to the running position.

FIGURE 27 is a sectional view taken along line 27—27 of FIGURE 25, illustrating the hydraulic passageways which coact with the spool of the start and stop valve.

FIGURE 28 is a sectional view taken along line 28—28 of FIGURE 25, further illustrating the hydraulic passageways and valve spool which initiate the gear shifting operation.

FIGURE 29 is a sectional view taken along line 29—29 of FIGURE 25, illustrating the relay valve spool which regulates the brake when the starting lever is in a neutral position.

FIGURE 30 is a fragmentary sectional view taken along line 30—30 of FIGURE 17, illustrating the hydraulic mechanism including the shot bolt cylinder which latches the main starting lever in its neutral position during the shifting cycle.

FIGURE 31 is a sectional view taken along line 31—31 of FIGURE 30, detailing the hydraulic cylinder which actuates the shot bolt.

Figure 1:
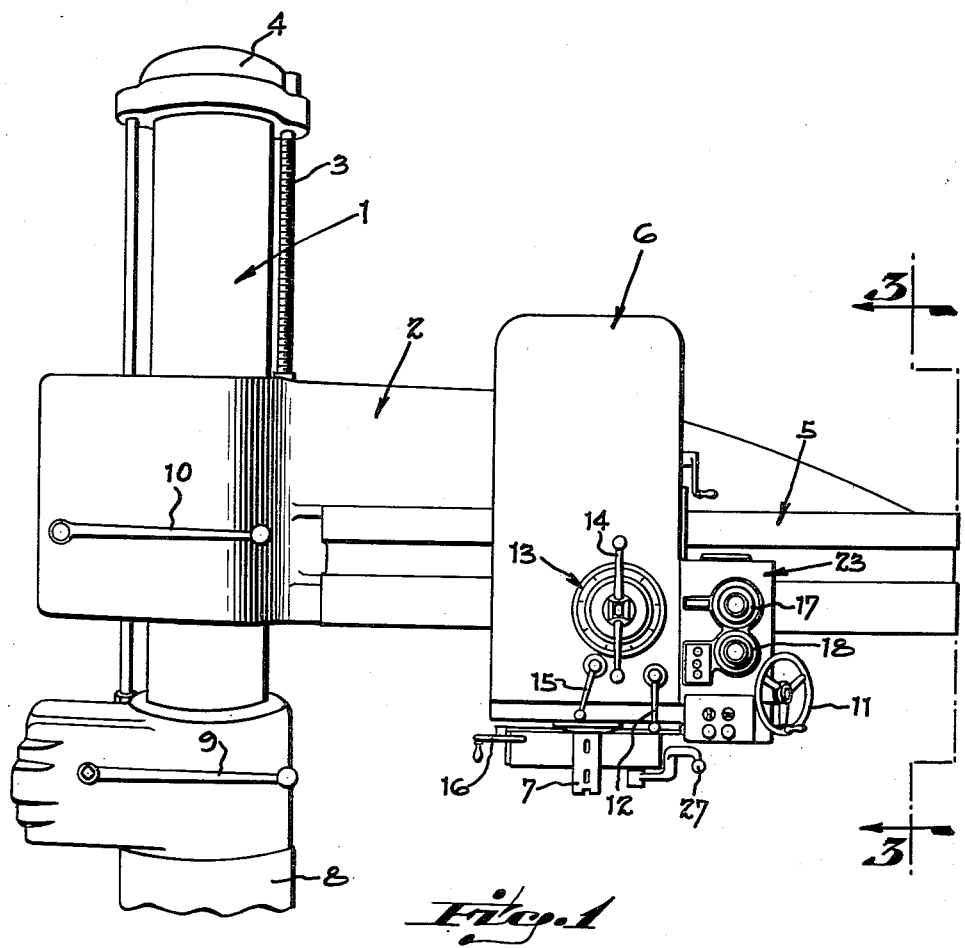
FIGURE 1 is a fragmentary view of a radial drill which is equipped with the hydraulic spindle speed and feed change transmission of the present invention.
Figure 32:
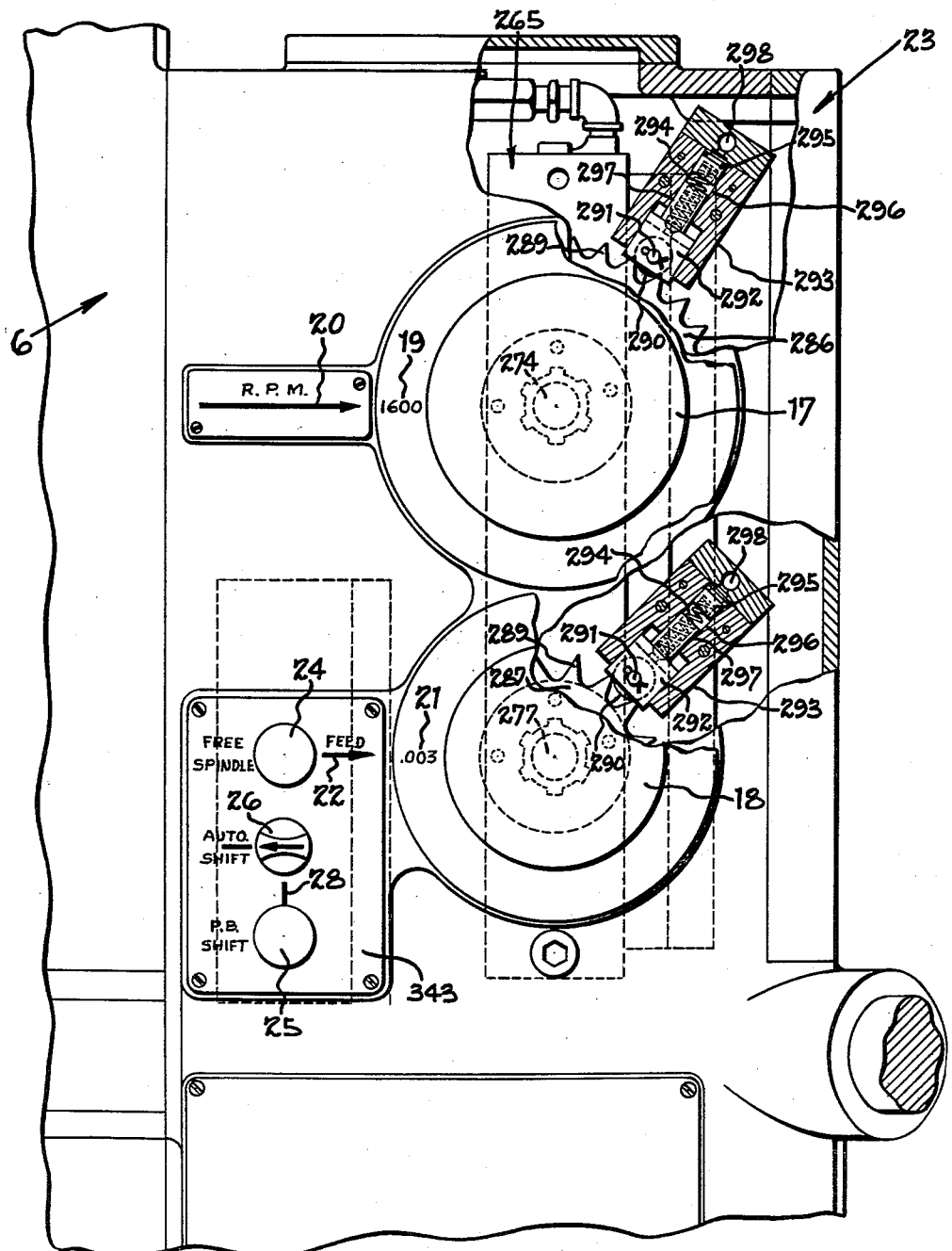

FIGURE 32 is an enlarged fragmentary view partially in section taken from FIGURE 1, illustrating the speed and feed selector dials and push buttons which select speed and feeds and control the machine functions.

FIGURE 33 is an enlarged fragmentary view taken from FIGURE 10, further illustrating the speed and feed selector valve and dial arrangement.

FIGURE 34 is a rear view projected from FIGURE 33, further illustrating the speed and feed selector valve block.

FIGURE 35 is a sectional view taken along line 35—35 of FIGURE 33, illustrating one of the valve spools and related ports of the selector valve.

FIGURE 36 is a fragmentary sectional view taken along line 36—36 of FIGURE 34, detailing the ball bearing arrangement which rotatably journals the piston of the cam plate shifter.

FIGURE 37 is a fragmentary sectional view taken from FIGURE 35, but at a different plane to illustrate the spring loaded plunger which frictionally engages each valve spool of the selector valve.

FIGURE 38 is a sectional view taken along line 38—38 of FIGURE 34, further illustrating the components of the selector valve.

FIGURE 39 is a sectional view taken along line 39—39 of FIGURE 38, illustrating the cam plates which shift the speed and feed selector valve spools, the cam plates being shown in the extended position.

FIGURE 40 is a view similar to FIGURE 38, showing the position of the valve spools after the cam plates have been shifted to their retracted spool-shifting position.

FIGURE 41 is a sectional view taken along line 41—41 of FIGURE 40, showing the ends of the valve spools in relation to the cam plates.

Figures 42, 43:
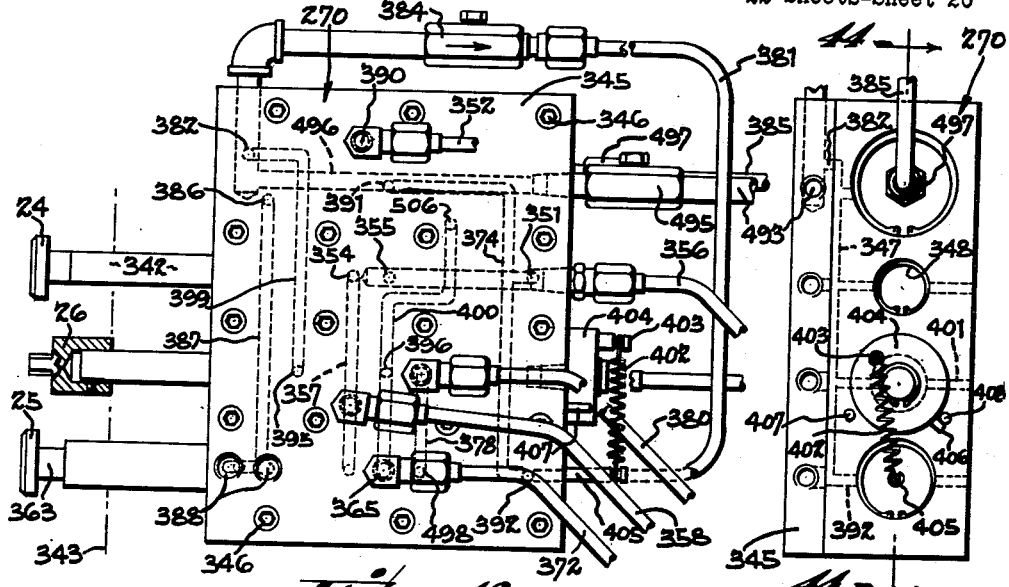

FIGURE 42 is a fragmentary side elevation of the push button valve block as viewed along line 42—42 of FIGURE 9.

FIGURE 43 is a rear view projected from FIGURE 42, further illustrating the push button valve block.

Figures 44, 45:
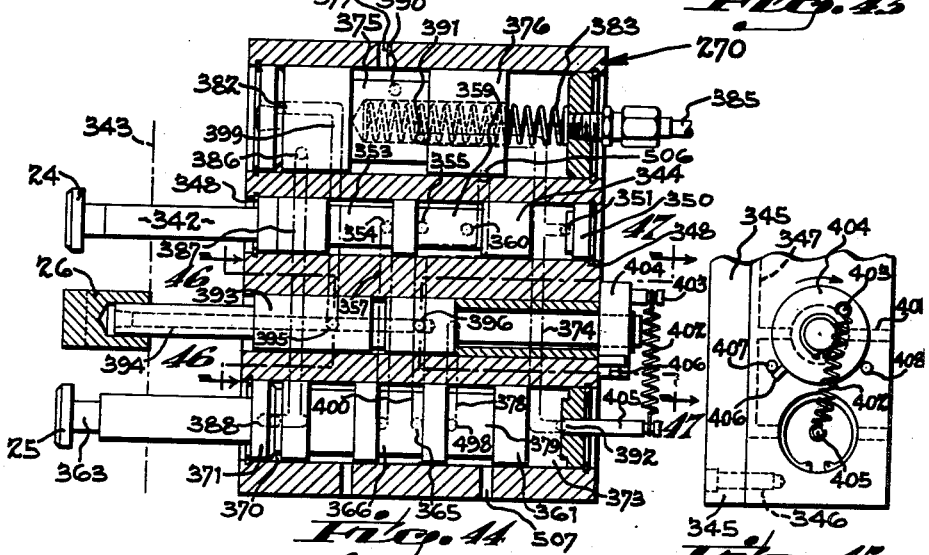

FIGURE 44 is a sectional view taken along line 44—44 of FIGURE 43, detailing the valve block and spools.

FIGURE 45 is a fragmentary rear view projected from FIGURE 44, showing the rotary selector valve shifted to its second position providing manual push button selection of speeds and feeds.

Figures 46, 47:
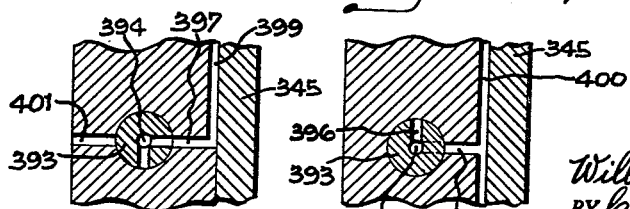

FIGURE 46 is a sectional view taken along line 46—46 of FIGURE 44, showing one set of hydraulic passageways of the rotary selector valve.

FIGURE 47 is a sectional view taken along line 47—47 of FIGURE 44, showing a second set of passageways of the rotary valve.

Figure 4:
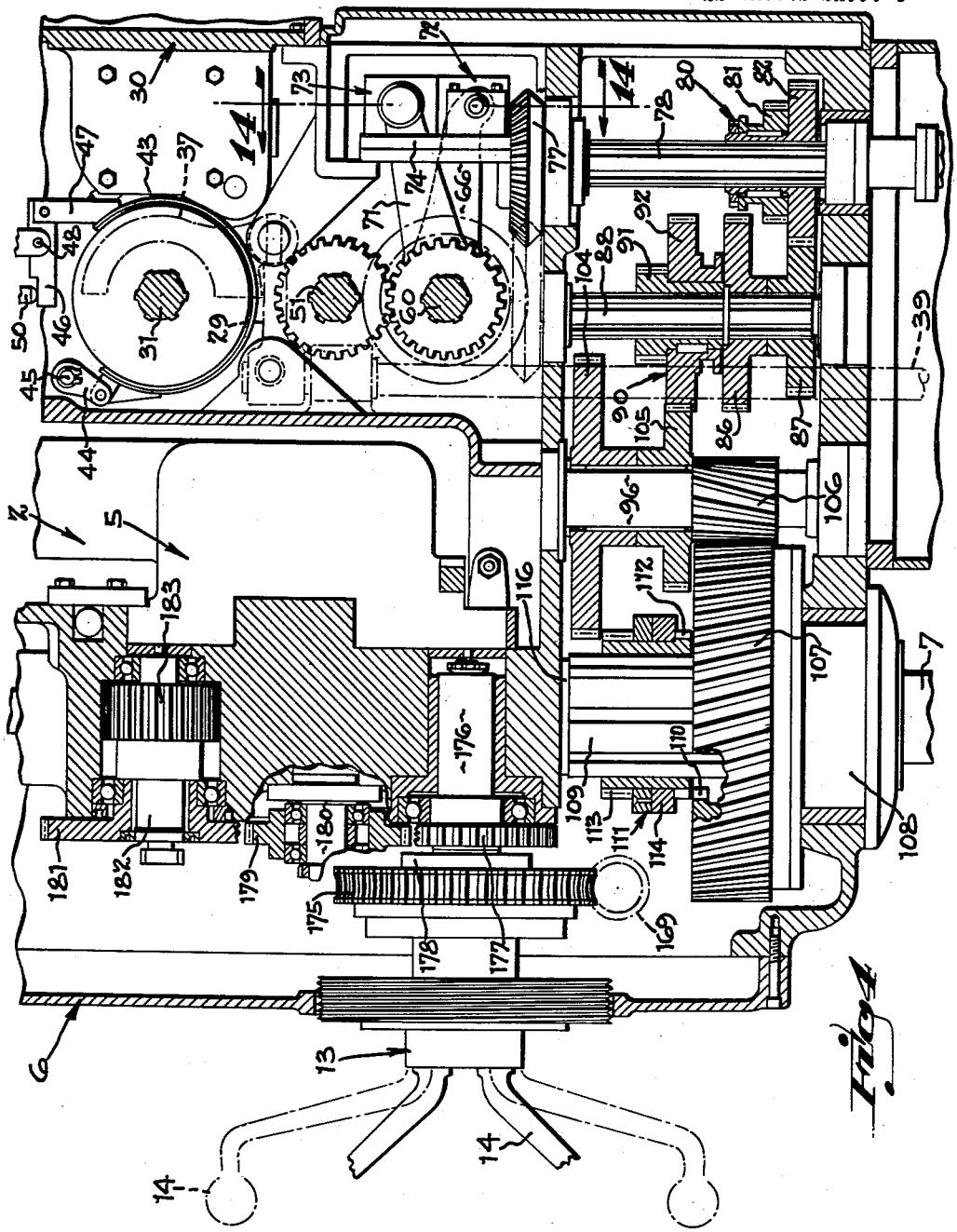
FIGURE 4 is an enlarged sectional view taken along line 4—4 of FIGURE 2, detailing a portion of the spindle speed change transmission and certain parts of the feed transmission.

FIGURE 48 is a sectional view similar to FIGURE 44, showing the push button valve block with the free spindle valve button depressed for uncoupling the spindle from the speed change transmission, the spindle clutch element being shifted to the neutral position, as shown in FIGURE 4 and 14A.

FIGURE 49 is a view similar to FIGURE 48, showing the push button valve plunger depressed for push button control of the gear shifting cycle.

FIGURE 50 is a fragmentary sectional view illustrating the servomotion of the manual shift push button valve when the stem is depressed, as shown in FIGURE 49.

Figure 51:
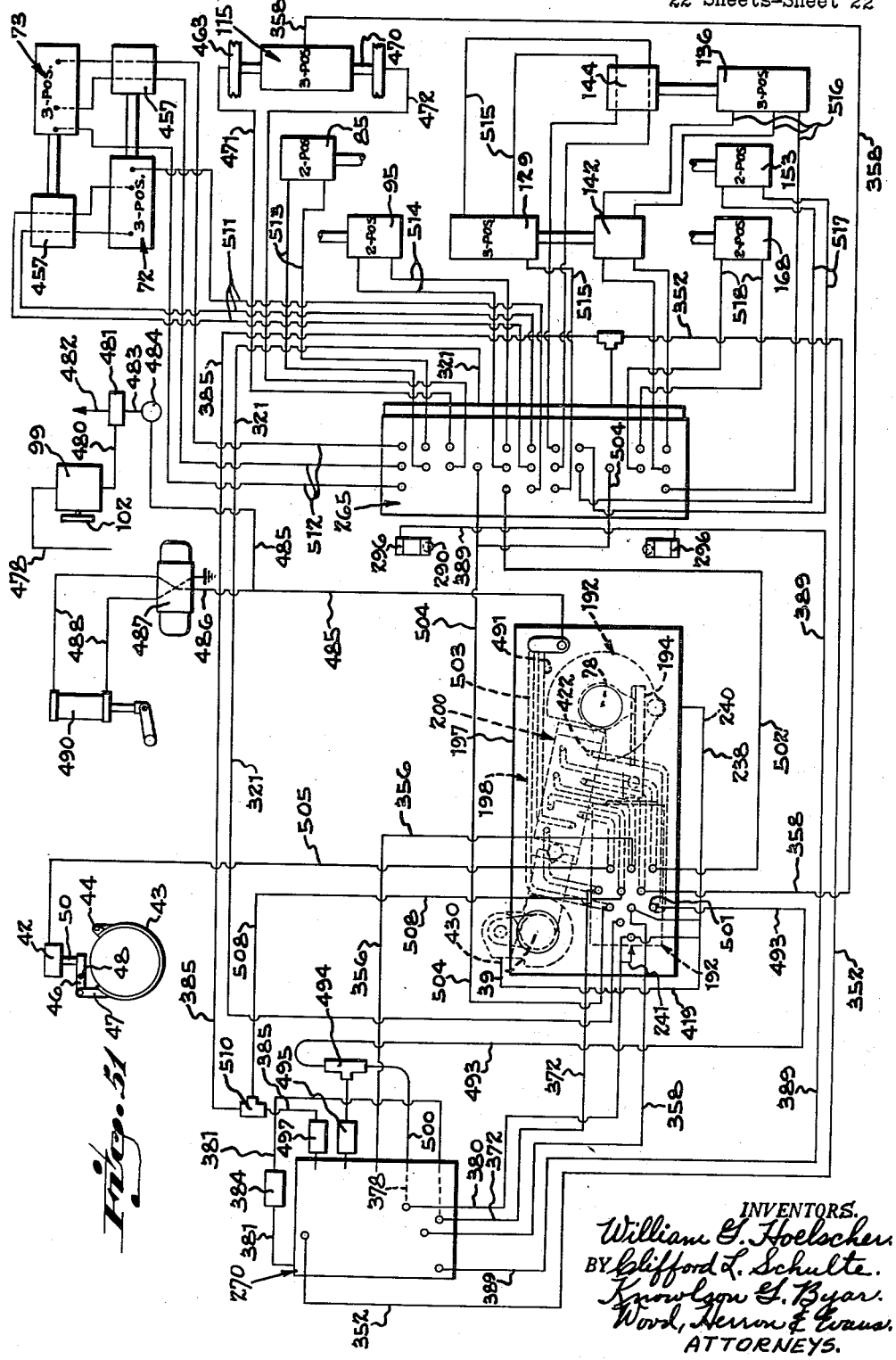

FIGURE 51 is a diagram illustrating the hydraulic circuit, valve and actuating components.

*General Arrangement and Operation*

Figure 2:
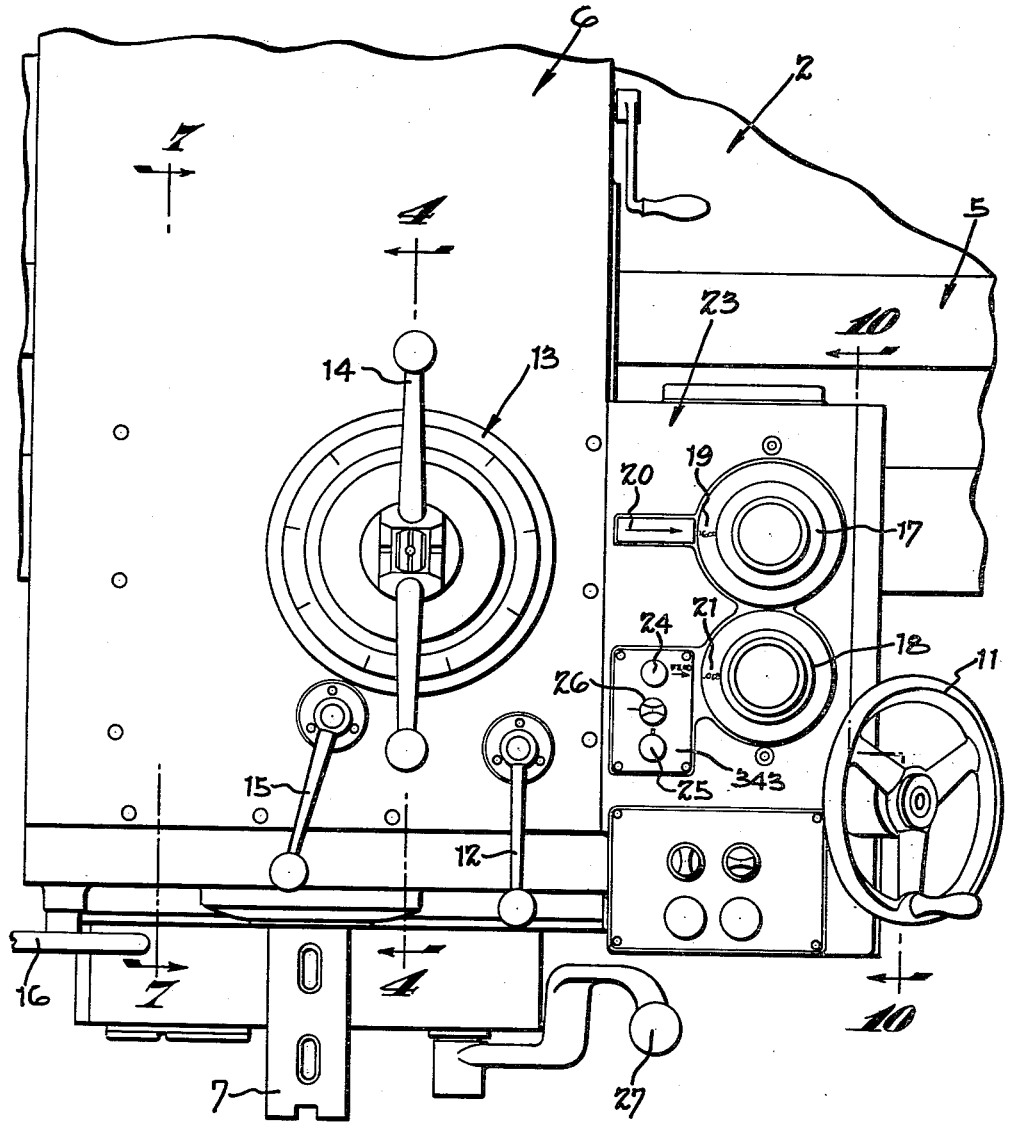
FIGURE 2 is an enlarged fragmentary view of the head of the drill, illustrating the selector dials and other components for regulating the spindle speed and feed transmission.

As noted above, the hydraulic control system of the present invention is intended particularly for regulating the spindle and spindle feed of a machine tool, such as a radial drill or the like. In order to bring out the principles of the invention, the structure and operation of a typical radial drill is described with reference to FIGURES 1–3, the drill head being equipped with the present hydraulic system.

As best shown in FIGURE 1, the radial drill comprises a vertical column 1 which is mounted upon a vertical axis for rotary motion with respect to the stationary base (not shown), upon which the workpiece is clamped during the machining operation. An arm 2 is slidably mounted upon the column and is adapted to be raised or lowered along the column by means of an elevating screw 3, which is suspended from a cap 4 mounted at the top of the column. The arm includes a nut (not shown) which is threaded to the elevating screw, power means being provided for rotating the nut in forward or reverse directions, thereby to raise or lower the arm with reference to the column. The arm 2 includes ways 5 slidably supporting a drill head 6, the drill head being movable along the arm, either manually or by power, as explained later.

The hydraulically controlled speed and feed transmission system and the control means thereof are mounted within the head and within a housing attached thereto. The transmission system is in driving connection with the drill spindle 7 for rotating the spindle at a selected cutting speed and also for feeding the spindle axially at a selected feed rate. The cutting tool (not shown) such as a drill, boring tool, tap or the like is mounted in the lower portion of the spindle and the rotating tool is thus advanced axially with respect to the workpiece which is mounted on the base of the machine.

It will be understood at this point, that in operating the machine, the arm may be shifted vertically along the column to bring the head 6 to a required elevation above the workpiece. In order to center the spindle 7 with respect to the hole center, the head and arm may be swung radially and the head may be shifted horizontally along the ways 5 of the arm, thus shifting the spindle axis about two generally right angular coordinates for centering the tool axis with respect to the center of the hole.

In order to permit rotary movement of the column and radial arm motion, the column 1 is journalled in a stump 8 which rises from the base (FIGURE 1). The stump 8 includes a column clamp (not shown) which may be operated by a hand lever 9 for locking the arm and column in a selected radial position. If desired, the column clamp may be power operated (not shown) and controlled by suitable control means mounted on the head. The head is also provided with clamping means (not shown) for clamping the head rigidly at a selected point along the ways 5 of the arm. In addition, the arm is provided with a lever 10 which actuates a clamp for clamping the arm to the column; this lever may also control the elevating mechanism for raising or lowering the arm relative to the column.

In order to shift the head 6 along the arm ways 5, there is provided a hand wheel 11 at the front of the head, which is in driving connection with a rack (not shown) carried by the arm. The hand wheel 11 may be rotated to shift the head slowly along the arm (with the head clamp in unclamped position) so as to bring the tool axis precisely in alignment with a selected hole center. The head is also provided with power traverse means (not shown) for shifting the head along the arm. This mechanism is controlled by the power traverse lever 12 also located at the front of the head.

In order to control the axial feed motion of the spindle, the head is provided with a graduated depth dial or gauge indicated generally at 13, having arms or horns 14 which may be actuated manually to disengage the dial from the spindle feed mechanism. This structure adapts the depth gauge 13 to be set for a predetermined degree of spindle feed, whereby the feed is automatically decommissioned when the cutting tool reaches the preset depth with respect to the workpiece. The power spindle feed may be disengaged by tripping the hand lever 15 at the front of the head. The spindle may also be fed axially by hand by operation of the hand wheel 16, which is mounted for rotation adjacent the spindle 7.

The structure so far described does not form an essential part of the present invention but represents a machine tool selected to illustrate the principles of the invention. As noted above, the spindle 7 is rotated at a selected speed and is fed axially at a selected feed rate by the hydraulic control apparatus of this invention. The present apparatus provides thirty-two spindle speeds which may be selected by rotating the speed selector dial 17 (FIGURES 1 and 32) which is mounted on the front of the head. The dial 17 is interconnected with a hydraulic speed selector valve, as explained later. The apparatus provides sixteen spindle feed rates which are selected by rotating the feed selector dial 18; this dial is mounted immediately below the speed selector dial 17. The speed selector dial 17 includes direct reading speed indications 19 (FIGURE 32) which rotate with the dial relative to a reference arrow 20 to indicate the selected spindle speed in revolutions per minute. The feed dial 18 likewise is provided with direct reading feed indications 21 which shift with the dial relative to a feed reference arrow indicated at 22. The feed indications read directly in thousandths of an inch spindle feed per revolution of the spindle. The dials 17 and 18 and the associated selector valves, as described later, are mounted within a housing 23 which is attached to one side of the head, as best shown in FIGURE 32.

The hydraulic control system also includes a pair of push button valves mounted in the housing 23 and having push buttons (FIGURE 32) mounted adjacent the feed selector dial 18 adapted to be depressed by the operator to carry out certain machine functions. Thus, the push button indicated at 24 uncouples the spindle from the spindle speed change transmission upon being depressed, providing free spindle rotation so as to facilitate tool changing and certain other manual operations. The push button indicated at 25 initiates gear shifting, the gears being preselected by operation of the dials 17 and 18 and shifted when the button 25 is depressed. There is also provided a manually operated selector valve which is rotated by means of the knob 26. The selector knob 26 may be rotated to two positions providing automatic gear shifting when shifted to the position shown in FIGURE 32.

When the knob 26 is in the "AUTO. SHIFT" position in alignment with the reference line 28 (FIGURE 32), the preselected gears are shifted hydraulically when the start stop lever 27 (FIGURE 1) is shifted manually to the spindle stopping position at the end of a given operation, as explained later. In other words, while the spindle is machining a given hole, the speed and feed rates are preselected manually for the next successive operation by rotating the speed and feed dials 17 and 18, thus saving the time which is ordinarily consumed in shutting down the machine to select the speeds and feeds. When the first machining operation is complete, the hand lever 27 is shifted to a neutral position to stop the spindle, causing the spindle to be braked to a stop; thereafter, the preselected gears are reciprocated, then shifted to provide the new speed and feed rates for the next operation.

The start and stop lever 27 is shiftable to three positions, consisting of a neutral or braking position, a forward spindle position and a reverse spindle position. When shifted to the intermediate or neutral position, a brake is applied to stop the spindle, then the preselected gears are shifted. Thereafter, the lever may be shifted to either position from neutral to rotate the spindle in the forward or reverse direction at the new speed and feed rate.

When the selector knob 26 is shifted to the "P.B. SHIFT" (push button shift) position, the operator's time is saved because the machine does not go through the shifting cycle each time the lever 27 is shifted to neutral. In other words, the operator may select a trial feed and speed rate with the dials, then may shift the lever 27 to a position to rotate the spindle at the selected speed and feed, and immediately reverse spindle rotation by shifting the lever to the reverse position. Push button operation is also desirable when tapping a hole since the spindle can be quickly reversed (without initiating a shifting cycle) to bring out the tap after completion of the operation.

During boring, drilling and operations other than tapping, the spindle feed is decommissioned by a tripping mechanism in response to the setting of the depth dial 13 when the tool reaches the preset depth with respect to the workpiece. At this point, the spindle may be retracted at a rapid rate by rotating the arms 14 of the depth gauge. After the spindle is retracted (with the hand lever 27 in its neutral or braking position) the head may be repositioned, as outlined above, to bring the spindle and tool axis into alignment with the center of the next hole. The head, arm and column are then clamped and the gear shifting and machining cycle is again initiated by shifting the starting lever 27 from neutral to the forward position.

*Spindle Speed Change Transmission*

Figure 5:
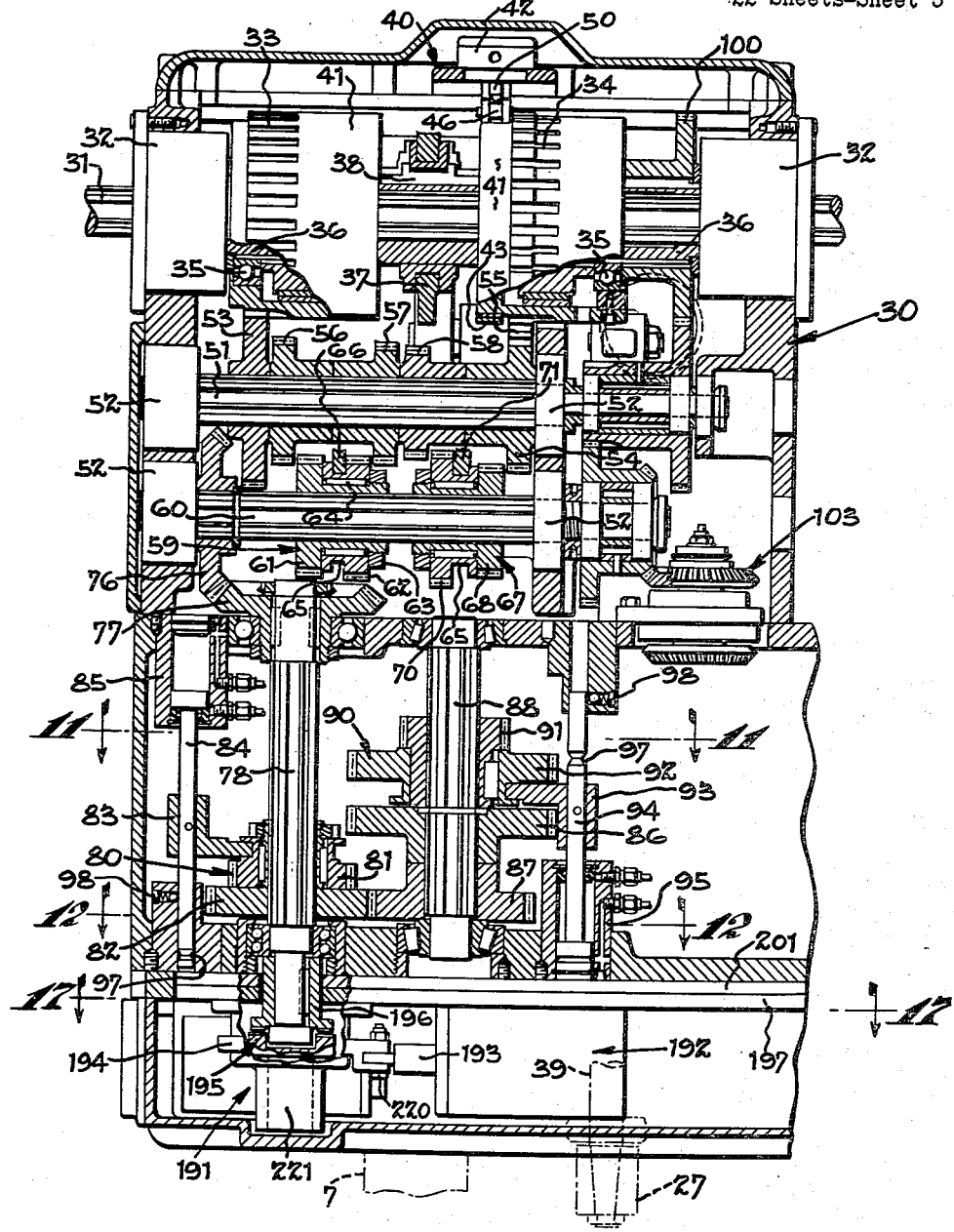
FIGURE 5 is a sectional view taken along line 5—5 of FIGURE 3, further illustrating the spindle speed change transmission.
Figure 8:
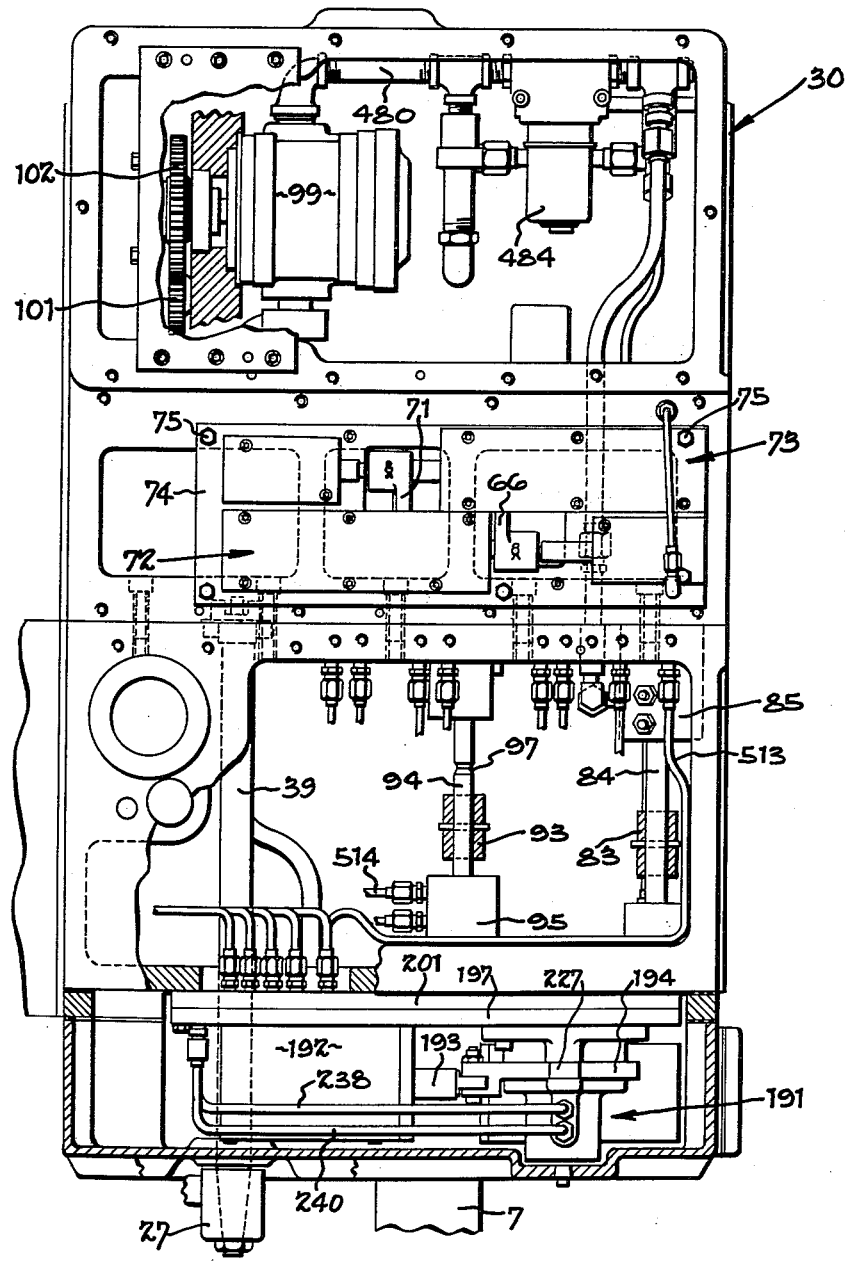
FIGURE 8 is a sectional view taken along line 8—8 of FIGURE 3, showing the hydraulic pump system and the speed change shifter cylinders within the head.
Figure 11:
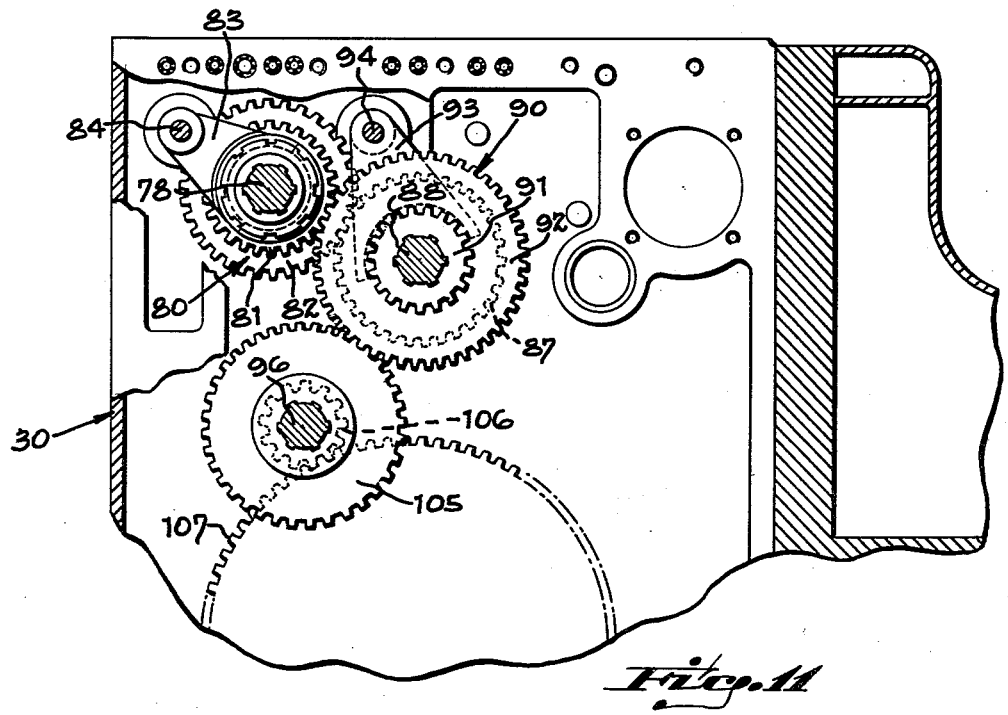
FIGURE 11 is a sectional view taken along line 11—11 of FIGURE 5, further illustrating a portion of the speed change transmission.

The thirty-two spindle speeds are provided by a transmission system which is mounted within a housing 30 (FIGURES 3, 5 and 8) attached to the drill head 6, the housing being disposed to the rearward side of arm 2. Referring now to FIGURE 5, the transmission is powered by a horizontal spline shaft 31 which extends parallel with the arm, shaft 31 being in driving connection with a power motor (not shown), mounted on the arm beyond the column. The spline shaft 31 provides a slidable driving connection with the transmission system, adapting the head to be shifted along the arm when the tool is being aligned with the hole center. The spline shaft 31 is rotatably journalled in ball bearings 32—32 which are mounted in the walls of the transmission housing 30.

Power is transmitted from spline shaft 30 to the transmission by way of a forward gear 33 or a reversing gear 34 under control of the starting lever 27 (FIGURE 5). For this purpose, the gears 33 and 34 are rotatably journalled as at 35 upon the axes of respective clutch elements 36—36 which are splined to the shaft 31. A yoke 37, connected to the starting lever 27 by an arm 29 of shaft 39 (broken lines—FIGURE 4) actuates a clutch-engaging element 38 (FIGURE 5) which is common to both clutches.

When the starting lever 27 is swung from its neutral position to shift the clutch-engaging element 38 toward the left, the clutch element 36 couples the forward gear 33 to the spline shaft while the reversing gear 34 idles.

When the clutch-engaging element is shifted toward the right, then the spline shaft is coupled to the reversing gear 34 while the forward gear 33 idles. When the starting lever 27 is in its neutral position, the forward and reverse gears are free to idle and a brake 40 applies braking pressure to the cylindrical portion 41 of gear 34. The braking pressure is applied by a hydraulic brake cylinder 42, as explained later in detail.

As shown in FIGURES 4 and 51, brake 40 comprises a brake band 43 having one end pivotally connected to the free end of a link 44, the opposite end of the link being pivotally connected as at 45 to the housing 30. Braking pressure is applied to the band by a lever 46 connected as at 47 to the free end of the band. The lever is pivotally supported with reference to the housing 30 by a pivot pin 48, the free end of the lever 46 being engaged by the plunger 50 of the brake cylinder 42. Briefly, when the starting lever 27 is shifted to its intermediate braking position, the brake band 43 brakes the forward and reverse gears 33 and 34, so as to stop the rotating transmission gears, then the hydraulic system releases the brake for operation of a reciprocator which oscillates the gears during the shifting cycle, as explained later. The brake again engages after the shifting cycle and disengages only when the starting lever 27 is shifted from neutral to apply power to the transmission.

The transmission includes a countershaft 51 (FIGURE 5) rotatably journalled in ball bearings 52—52 and having gears in constant mesh with the forward and reversing gears 33 and 34. Thus, the gear 53 is in constant mesh with the forward gear 33 and is splined to the countershaft 51. A similar gear 54 is in constant driving connection with the reversing gear 34; however, in order to provide reverse rotation, an idler gear 55 is interposed between gear 34 and gear 54.

Splined to the counter shaft 51 is a set of three gears indicated at 56, 57 and 58 adapted to provide three speed changes, a fourth speed change being provided by the gear 54 which is in constant mesh with the reversing idler gear 55. The clusters of shiftable speed change gears are slidably mounted upon a spline shaft 60 mounted parallel with the shaft 51 and also rotatably journalled in ball bearings 52—52. The first cluster, indicated generally at 59, comprises gears 61 and 62, the two gears being clamped together by a ring 63 and keyed together as at 64. The gear cluster 59 includes a groove 65 which is engaged by a yoke or shifter fork 66. This gear cluster has three positions and is shown in an intermediate or neutral position. Upon being shifted to the left, gear 61 meshes with the driven gear 56, and upon being shifted to the right, the gear 62 meshes with the driven gear 57.

Also slidably mounted on the spline shaft 60 is a second gear cluster, indicated generally at 67, comprising gears 68 and 70, adapted to mesh with the gears 54 and 58. This gear cluster is similar to the cluster 59 and includes a yoke or shifter fork 71 similarly engaged in a groove 65 for shifting the cluster in either direction. It will be noted that the gear clusters 59 and 67 will drive the spline shaft 60 at four different speeds through selective shifting of the two clusters 59 and 67.

The two clusters are shifted hydraulically by respective shifter cylinders. Thus, as viewed in FIGURES 4 and 8, the shifter fork 66 of gear cluster 59 is actuated by a three-position hydraulic cylinder, indicated generally at 72 and the shifter fork 71 of gear cluster 67 is actuated by a three-position hydraulic cylinder indicated generally at 73. The hydraulic cylinders 72 and 73 are duplicates of one another as shown in FIGURE 14, and are described later with reference to the hydraulic circuit.

It will be understood at this point that the cylinders are mounted upon a mounting plate 74 (FIGURE 8) which is bolted as at 75 to the housing 30. Housing 30 is provided with a cover plate providing access to the cylinders and other hydraulic components for convenience in assembly and servicing operations. It will be understood that the three-position hydraulic cylinders 72 and 73 are shifted to their several positions in accordance with the selected position of the speed dial 17.

The left hand end of the spline shaft 60 includes a bevel gear 76 keyed thereto and meshing with a companion bevel gear 77 (FIGURE 5) which is keyed to a rotatable vertical shaft 78. A slidable gear cluster, indicated generally at 80, is slidably mounted upon the spline shaft 78 and comprises two gears 81 and 82. The gear cluster 80 is shifted by a yoke 83 which is pinned to the piston rod 84 of a two-position hydraulic cylinder 85, which is mounted within the housing 30. The hydraulic cylinder 85 is also energized by the hydraulic system in response to the position of the speed selector dial 17.

The gears 81 and 82 (shaft 78) are arranged to mesh selectively with the gears 86 and 87 which are keyed to a second vertical spline shaft 88, also rotatably journaled in the housing 30. As best shown in FIGURE 5, the shaft 88 includes a shiftable gear cluster, indicated generally at 90, comprising gears 91 and 92. Gear cluster 90 is shiftable to two positions by a yoke 93 attached to the piston rod 94 of a two-position hydraulic cylinder 95. The gear cluster 90 meshes with a pair of companion gears keyed to a rotatable vertical shaft 96 (FIGURE 4), as explained later.

Referring back to FIGURE 5, it will be noted that the piston rods 84 and 94 are each grooved as at 97 for cooperation with respective spring-loaded detent balls, as indicated at 98. The detent balls engage the respective grooves 97 when the piston rods and associated gear clusters are shifted from the position shown in FIGURE 5 to their elevated positions, thereby to prevent the gears from shifting out of mesh when the machine and hydraulic pump are shut down.

It will also be understood at this point that the hydraulic pump 99 (FIGURE 8) which powers the hydraulic system, is driven by the main motor and power shaft 31. For this purpose, there is provided a gear 100 (FIGURE 5) which is in constant driving connection with the spline shaft 31. This gear meshes with an idler gear 101 (FIGURE 8) which in turn drives the gear 102 of pump 99.

The gear 100 (FIGURE 5) also drives a gear train, indicated generally at 103, which forms part of a power traverse mechanism for shifting the head under power along the arm. As noted earlier with reference to FIGURE 1, this mechanism is controlled by the hand lever 12. The traverse mechanism forms no part of the present invention and has been omitted from the disclosure.

Referring again to FIGURE 4, it will be noted that the gears 91 and 92 (shaft 88) are adapted to mesh selectively with the gears 104 or 105 (shaft 96) through operation of the two-position cylinder 95 (FIGURE 5). Shaft 96 includes a pinion 106 meshing with a gear 107 rotatably journalled as at 108 upon the axis of a splined sleeve section 109, which forms a part of the spindle sleeve 116 (FIGURE 13) the spindle 7 being slidable axially within the sleeve, as explained later. The gear 107 includes internal clutch teeth 110 (FIGURE 4). A clutch element indicated generally at 111 is slidably keyed to the splined section 109 and includes clutch teeth 112 at its lower end, adapted to mesh with the clutch teeth 110 of gear 107, the clutch element being shown in its neutral or free spindle position in FIGURE 4. In this position, the spindle sleeve and spindle may be rotated by hand to facilitate tool changing or the like, as noted earlier.

The upper end of the clutch element 111 includes a pinion 113 adapted to mesh with the gear 104. When the pinion 113 meshes with gear 104, a high speed drive is established to the sleeve section 109, and when shifted downwardly to engage the internal clutch teeth 110 with the teeth of gear 107, a low speed drive is established to sleeve section 109.

The clutch element 111 is shifted by a yoke 114 (FIGURE 4) projecting from a three-position floating cylinder (FIGURE 14A) which is indicated generally at 115. This cylinder is also controlled by the speed dial 17. The construction and operation of cylinder 115 is explained later with reference to the hydraulic system.

In summary, the thirty-two spindle speeds are brought about by the combined shifting motions of the three three-position cylinders 72, 73 and 115 and by the two two-position cylinders 85 and 95. Thus, gear clusters 59 and 67 of shaft 60 (three-position cylinders 72 and 73) drive the vertical shaft 78 at four different speeds (FIGURE 5). Gear cluster 80 of shaft 78 (two-position cylinder 85) combines with the four speeds to drive vertical shaft 88 at eight different speeds. The gear cluster 90 of shaft 88 (two-position cylinder 95) combines with the preceding gear clusters to drive the shaft 96 (FIGURE 4) at sixteen different speeds. Finally, the clutch and gear element 111 of sleeve 109 (three-position cylinder 115) combines with the other shiftable gears to drive the spindle sleeve 116 and spindle at thirty-two selected speeds. It will be understood at this point that the speed selector valve and hydraulic system is such that only those gears are shifted to a new position as are required to bring about a given selected speed; other gears, which are in the correct position for the new speed, remain unmoved during the shifting cycle.

*Feed Change Transmission*

Figure 3:
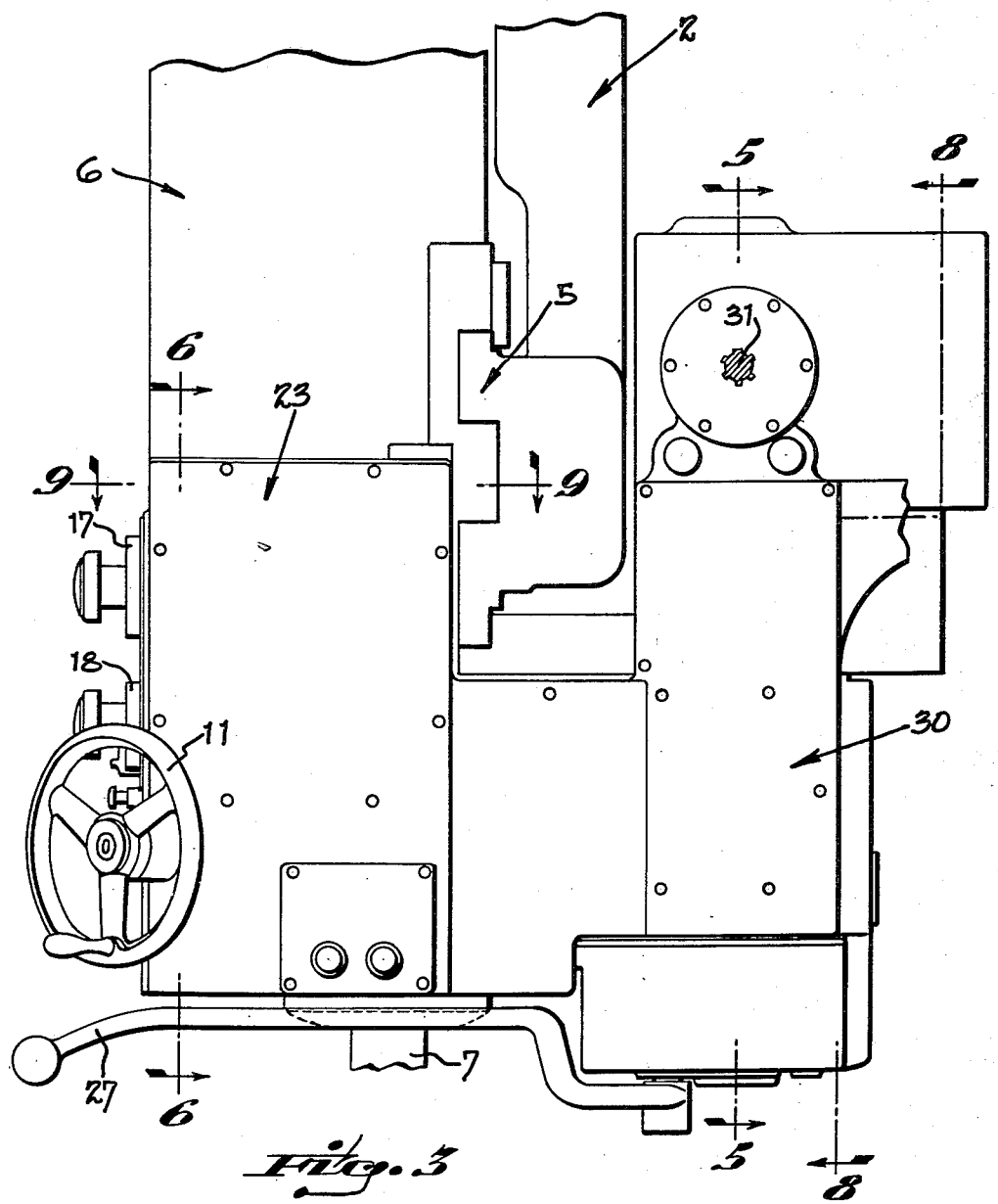
FIGURE 3 is an end view taken along line 3—3 of FIGURE 1, further illustrating the drill head in relation to the arm of the radial drill.

As viewed in FIGURE 3, the spindle feed change transmission is located within the drill head 6 on the side of the arm opposite the speed transmission housing 30, such that the two housings partially counterbalance one another with respect to the arm. As noted earlier, the feed transmission provides a total of sixteen spindle feeds which are selected by rotating the spindle feed dial 18. The feed transmission is driven from the spindle driving system as shown in FIGURE 13, thus relating spindle speed to axial spindle feed motion. By way of example, one of the selected feed rates may provide .003″ axial spindle feed per revolution of the spindle, as indicated in FIGURE 32.

Referring to FIGURE 13, which represents a development of the feed change transmission, the spindle sleeve 116, which includes the splined section 109, previously described, includes a gear 117 which meshes with a driven gear 118 to drive the feed transmission. Gear 118 is keyed to a splined countershaft 120, which is rotatably journalled in the head parallel with the sleeve 116. A three-position shiftable gear cluster, indicated generally at 121, is slidably mounted upon spline shaft 120 and includes a groove 122 engaged by a yoke 123 for shifting the cluster.

A second three-position gear cluster, indicated generally at 124, is also slidably mounted upon the countershaft 120 and includes a yoke 125 for shifting the cluster. A second countershaft 126 is rotatably journalled adjacent countershaft 120 and includes four gears, indicated at 127, 128, 130 and 131. The gears 132 and 133 of the shiftable cluster 121 are adapted to mesh with the gears 127 or 128 when the gear cluster 121 is shifted in either direction from the neutral position shown in FIGURE 13. Gears 134 and 135 of cluster 124 are adapted to mesh selectively with the gears 130 or 131 when the cluster is shifted in either direction from the neutral position shown.

Figure 7:
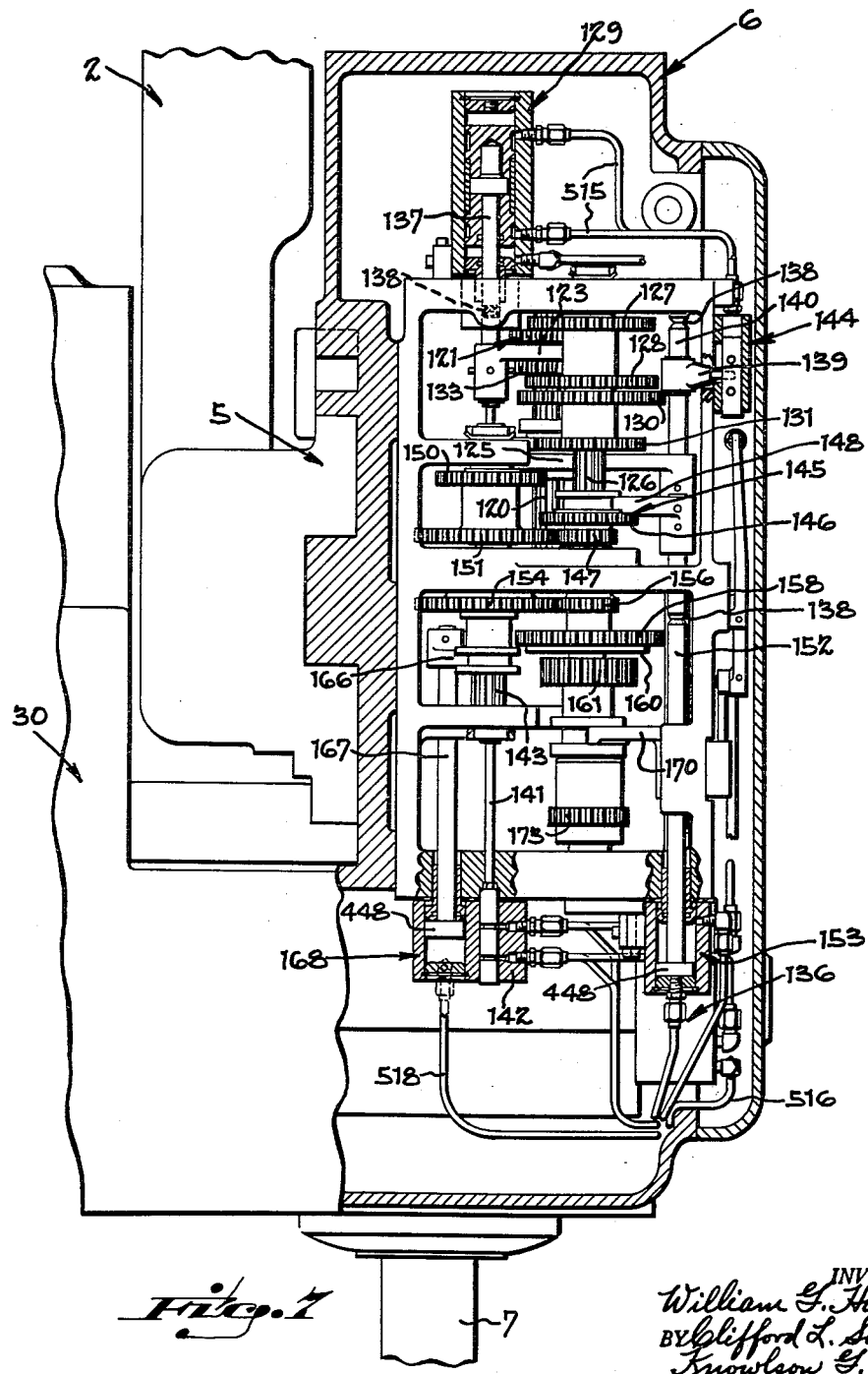
FIGURE 7 is a sectional view taken along line 7—7 of FIGURE 2, further detailing the spindle feed transmission system.

In order to shift the clusters 121 and 124, the yokes 123 and 125 are connected to respective three-position hydraulic cylinders. Referring now to FIGURE 7, which shows the feed transmission shafts and gears in their actual relative positions, the yoke 123 of cluster 121 is connected to the three-position hydraulic cylinder, indicated generally at 129, which is mounted in the top portion of the transmission. This cylinder is similar to the three-position cylinder 72 shown in FIGURE 14 and will be described later. The yoke 125 of gear cluster 124 is actuated by the three-position cylinder 136 mounted in the lower portion of the feed transmission (FIGURE 7).

The piston rod 137 of cylinder 129, and the rod 140 of three-position cylinder 136 are each grooved as at 138 for engagement by a spring loaded detent ball 98 for latching the piston rod and yoke 123 in the neutral and up position. The two-position piston rods are similarly grooved. In each case, the detent balls hold the gears in shifted position when the hydraulic pressure is shut down.

Since the clusters 121 and 124 are mounted in common upon shaft 120 (FIGURE 13), respective hydraulic interlocks are provided, which allow only one of the clusters to be meshed at any given time, thereby to prevent locking of the gear train. Thus, as shown in FIGURE 7, an interlock 141 is connected to the end of the piston rod 137 and actuates an interlock valve indicated generally at 142 which is mounted in the lower portion of the transmission. In order to avoid interference with the gear train, the interlock rod 141 passes through an axial bore formed in the third countershaft 143, which is described later with reference to FIGURE 13.

A second interlock valve, indicated generally at 144, is interconnected as at 139 with the piston rod 140 of the three-position cylinder 136. This valve is mounted in the upper portion of the transmission (FIGURE 7). The operation of the interlock valves is explained more in detail with reference to the hydraulic circuit; however, it will be understood at this point that when one of the gear clusters 121 or 124 (countershaft 120) is in mesh, then the interlock valves prevent the companion cluster gear from being shifted from neutral position. In other words, only one cluster gear 121 or 124 may be meshed at any given speed selection, otherwise the transmission would lock, as noted above.

Referring back to FIGURE 13, the second countershaft 126 includes a two-position gear cluster indicated generally at 145, consisting of gears 146 and 147. A yoke 148 is adapted to shift gear cluster 145 selectively into mesh with gears 150 or 151 which are keyed to the third countershaft 143. As shown in FIGURE 7, the yoke 148 of cluster 145 is attached to the piston rod 152 of a two-position hydraulic cylinder, indicated generally at 153, which is located at the lower portion of the transmission. Piston rod 152 also includes a groove 138 engageable with a detent ball 98 for latching the cluster 145 in the elevated position.

Referring to FIGURE 13, the third countershaft 143 includes a large gear 154 loosely journalled as at 155 for rotation relative to the axis of shaft 143. Gear 154 meshes with a pinion 156 which is mounted for rotation on the cylindrical portion 157 of the second countershaft 126. Pinion 156 includes a second large gear 158 having internal gear teeth 160. During normal operation of the machine, a shiftable gear 161 engages the internal gear teeth 160. As indicated by the broken lines 162 (FIGURE 13) a driven gear 163 meshes with a gear 161, the gear 163 being displaced from its true position in FIGURE 13. for purposes of illustration. Gear 163 imparts the feeding motion to the spindle, as explained later.

It will be noted that the gear 154 is provided with internal teeth 164 which are adapted to be engaged by a small gear 165 slidably mounted on the third countershaft 143. Gear 165 includes a yoke 166 adapted to shift the gear to two positions by means of a two-position hydraulic cylinder. Referring to FIGURE 7, the yoke 166 is attached to the piston rod 167 of a two-position hydraulic cylinder 168 which is mounted in the lower portion of the transmission. This cylinder is adapted to shift gear 165 from the position shown in FIGURE 13 to its second position engaging the internal coupling teeth 164 of gear 154.

In summary, the sixteen spindle feeds are brought about by the combined shifting motions of the two three-position cylinders 129 and 136 and by the two two-position cylinders 153 and 168. Thus, as shown in FIGURE 13, four feed rates are provided by the gear clusters 121 and 124 of shaft 120 (three-position cylinders 129 and 136—FIGURE 7). The two-position gear cluster 145 of shaft 126 (two-position cylinder 153) combines with the four previous speeds to drive the third countershaft 143 at eight feed rates. With the small gear 165 of shaft 143 shifted to the coupling position shown in FIGURE 7, the drive is by way of small gear 165 which engages the internal teeth 164 of large gear 154 providing a driving engagement therewith. Large gear 154 meshes with pinion 156 and drives gear 161 which is in mesh with the internal teeth 160. This drive constitutes the high speed range.

The eight speeds so far described are doubled by shifting the small gear 165 of shaft 143 (two-position cylinder 168) downwardly into mesh with the external teeth of large gear 158, thus providing the sixteen spindle feed rates, the drive being completed by way of the internal teeth 160 and gear 161 to the final drive gear 163.

The gear 161 of the second countershaft 126 is shiftable to a disengaged position with respect to teeth 160 in order to stop the spindle feed at a predetermined depth. For this purpose, the gear 161 includes a yoke 170 which is adapted to be tripped by a lever 171 (FIGURE 6) which forms a part of the depth gauge apparatus. Since this mechanism forms no part of the present invention, the details have been omitted from the description.

In addition, the lower end of shaft 126 includes a pinion 172 loosely journalled thereon as at 173. This pinion is adapted to be coupled as at 174 to the hub of gear 161. The pinion 172 is in driving connection with the hand feed wheel 12 previously noted with reference of FIGURE 1, which provides manual spindle feed motion. When the gear 161 is in the uncoupled position of FIGURE 7, the teeth 174 establish a driving engagement between gear 161 and pinion 172 so as to rotate the final drive gear 163 by rotation of hand wheel 12. This structure likewise forms no part of the invention.

Figure 6:
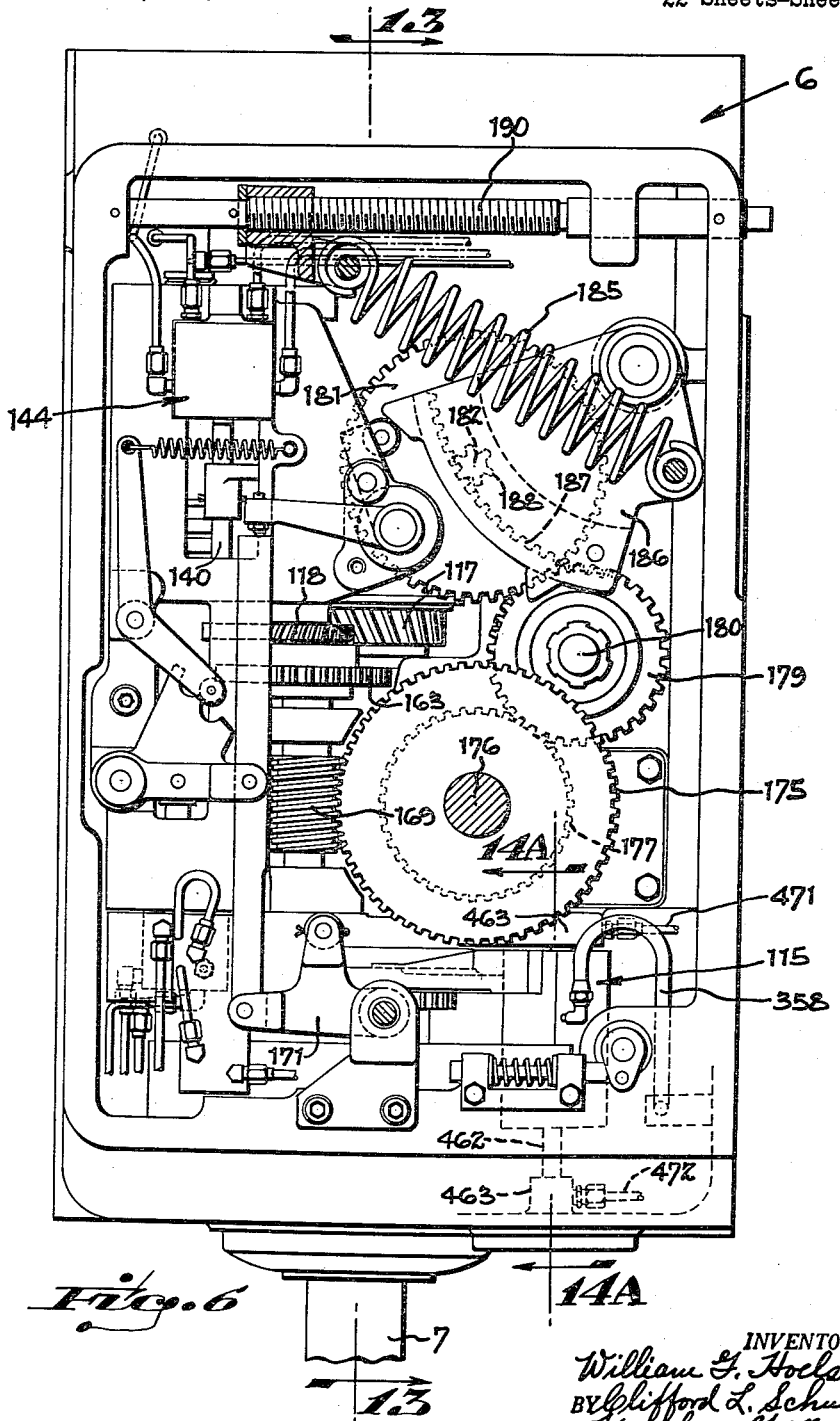
FIGURE 6 is an enlarged sectional view taken along line 6—6 of FIGURE 3, illustrating a portion of the spindle feed transmission and associated mechanism.

The gear train for transmitting the axial feed motion from the final drive gear 163 to the spindle is illustrated diagrammatically in FIGURE 13. The true relationship of the gears of this train is illustrated in FIGURES 4 and 6. As best shown in FIGURE 13, final drive gear 163, which meshes with the gear 161 is splined to a shaft 149 having a worm 169 meshing with a worm wheel 175. Worm wheel 175 is journalled on a shaft 176 and drives a gear 177, also mounted upon shaft 176. As shown in FIGURE 4, the gear 177 is coupled to the worm wheel 175 by a clutch 178, which may be disengaged by manually operating the arms or horns 14. As noted earlier, this arrangement adapts the depth gauge 13 to be set for a predetermined degree of axial spindle feed motion.

When the clutch 178 is engaged, the rotary motion of worm wheel 175 and gear 177 is transmitted to an idler gear 179 journalled as at 180 and meshing with gear 177. Idler gear 179 meshes with a large gear 181, keyed on shaft 182, and in driving connection with a pinion 183, also keyed to shaft 182. Pinion 183 meshes with a rack 184 which is rotatably journalled on the upper portion of the spindle assembly.

Since the spindle assembly forms no part of the invention, the structural details thereof have been omitted. However, it will be understood that the spindle sleeve 116 is journalled within the head by means of thrust bearings which resist axial sleeve motion, while the sleeve is rotated by gear 107 (FIGURE 4) at the selected spindle speed, as explained earlier. The spindle 7 extends through the sleeve 116 and is slidably splined thereto for axial motion. The rack 184, which is actuated by the feed transmission, is rotatably journalled on the upper portion of the spindle but is held against axial motion, adapting the pinion 183 to feed the rotating spindle axially with respect to the spindle sleeve 116.

As shown in FIGURE 6, the spindle driving system further includes a counterspring 185 connected to a gear sector 186 including gear teeth 187 meshing with a pinion 188. Pinion 188 is in driving connection with the gear shaft 182, previously described, which drives pinion 183 and rack 184. A screw shaft 190 is adapted to regulate the tension of the counterspring 185 to compensate for the weight of the tool which is mounted in the spindle 7. The counterspring is adapted to facilitate manual feeding of the spindle by operation of the horns 14—14, with the clutch 178 disengaged.

Hydraulic Reciprocator

As noted earlier, the speed and feed transmission system is provided with a hydraulic reciprocator arranged to rock the several gears and clutches in forward and reverse directions during the shifting cycle to facilitate meshing of the gear and clutch teeth. In other words, by operation of the reciprocator, the teeth of the gears and clutches are fully meshed before the power is applied to the transmission, thereby to prevent tooth interference or face driving, that is, application of driving force to contacting ends of face-to-face gears and consequent tooth damage when power is applied to the transmission. The reciprocator is so arranged that it is automatically disconnected from the transmission system when the shift is completed (with the teeth of the several gears and clutches properly meshed) and requires no attention by the operator. As explained earlier, the spindle speed change transmission (housing 30—FIGURE 3) drives the spindle at the selected speed, and the spindle in turn drives the feed transmission; therefore, the reciprocator mechanism rocks the components of both transmissions.

As shown in FIGURES 5 and 17–21, the reciprocator mechanism, indicated generally at 191, is mounted within the lower portion of the speed change housings 30 and is adapted to be coupled to the vertical spline shaft 78 thereof during the shifting cycle of the feed and speed change gears. It will be noted at this point, that the rocking motion imparted to shaft 78 is transmitted through the several gear trains of the speed change transmission and also to the spindle sleeve 116 by way of gear 107 (FIGURE 4). From the spindle sleeve 116, the rocking motion is transmitted by way of gear 117 (FIGURE 13) to the several shiftable gears and clutches of the feed change transmission.

It will be understood at this point, that the sustained rocking motion acts through the gear trains which were shifted into mesh during the prior speed and feed selection. Accordingly, certain gears or clutches will be out of mesh or inactive, while those components which remain in mesh reciprocate relative to the inactive components. During the actual gear shifting action, while reciprocation is sustained, the components reciprocate relative to one another for a distance equal to at least one tooth to insure proper meshing.

Described generally (FIGURE 5), the reciprocator comprises a hydraulic cylinder assembly 192 having a piston rod 193 coupled to a rack 194 which oscillates a shiftable hydraulic clutch element 195. Clutch 195 (shown disengaged in FIGURE 5) is adapted to engage a companion clutch element 196 which is keyed to the lower portion of vertical spline shaft 78. During the shifting cycle, the rack 194 is reciprocated by the hydraulic cylinder and the lower clutch element 195 is shifted upwardly into engagement with clutch element 196 (FIGURE 19) to transmit the rocking motion to the speed and feed change transmissions. After the shifting cycle is completed, the lower clutch 195 is shifted downwardly to the position shown in FIGURE 18 so as to offer no interference with the normal power operation of the speed and feed change transmissions.

When the system is under automatic control, the reciprocator is inactive during the machining operation, with the start and stop lever 27 in its forward or reverse spindle position. When the lever is shifted to the intermediate or neutral position, the hydraulic system applies the brake to stop the spindle. Thereafter, the system disengages the brake (as explained later), activates the reciprocator mechanism, causes the preselected gears to be shifted to their new positions, and finally stops the reciprocator and disengages clutch element 195. Thereafter, the lever 27 may be manually shifted in either direction from neutral to actuate the spindle in the forward or reverse directions at the new setting. When the selector knob is shifted to the "P.B. SHIFT" position, the hydraulic system commissions the reciprocator in the same manner to rock the gears and clutches during the shifting cycle, then decommissions the reciprocator, as explained later with reference to the hydraulic control circuit.

Described in detail with reference to FIGURES 17–22, the reciprocator cylinder assembly 192 is attached to a manifold plate 197 (FIGURE 18) which is grooved as at 198 to complete the hydraulic circuits from the main control system and between the reciprocator cylinder 192, hydraulic clutch 195, and the start and stop valve 200, which is actuated by the start and stop lever 27. The plate 197 is bolted to the bottom plate 201 (FIGURE 5) of the speed change transmission housing 30. The grooves 198 form closed passageways, as indicated by the broken lines 198 in FIGURE 17. When seated against bottom plate 201, the passageways 198 communicate with the holes 202 formed in the cylinder assembly 192 and in the start and stop valve 200, thus forming a self-contained unit with the components hydraulically interconnected.

As best shown in FIGURES 20 and 21, the rearward end of cylinder assembly 192 includes a valve block 203, which includes a sleeve-type shuttle valve indicated at 204 and a reversing spool valve, indicated generally at 205. The valves 204 and 205 coact with one another to provide sustained reciprocation of the reciprocator piston 206. Piston 206 includes a groove in which is seated a seal ring 207. The rearward side of piston 206 includes an actuating rod 208 which passes rearwardly through a packing gland 210 for actuating the shuttle valve 204 at the forward and rearward limits of piston travel, as explained later in detail. The piston rod 193 extends from the forward side of piston 206, through a gland 212 carried by a cylinder head 213 which encloses the forward end of cylinder 192. The cylinder 192 and cylinder head 213 are attached to the valve block 203 by means of studs 214 including nuts 215 engaging head 213.

Referring to FIGURE 17, it will be noted that the cylinder 192 and valve block 203 are secured to the manifold plate 197 (shown in broken lines) by means of screws 216, which are threaded into the bottom plate 201. The rack 194 (FIGURE 18) includes a clevis 217 at its inner end which straddles the flattened end portion 218 of piston rod 193, the clevis having a bolt 220 passing therethrough to provide an articulated connection between the piston rod and rack.

The lower clutch element, previously indicated at 195, comprises a clutch cylinder 221 (FIGURE 18) having a fixed intermediate wall 222, which delineates an upper chamber 223 and a lower chamber 224. The cylinder 221 includes a flanged housing 225 which is attached as at 216 to the plate 197. The rack 194 meshes with a pinion 226 within housing 225 and forming a part of upper clutch element 195, the rack being held in mesh by a roller 227 journalled as at 228 in the flange of housing 225 (FIGURE 17). The upper face of pinion 226 is provided with clutch teeth 230 (FIGURE 18) adapted to engage the companion teeth 231 formed on the upper clutch element 196. The upper clutch element 196 is keyed as at 232 to shaft 78 and is locked in place by a threaded collar 233.

The pinion 226 includes a piston 234 in sealing engagement with the upper chamber 223 and includes a vertical stem 235 passing in sealed engagement through the intermediate fixed wall 22. A lower piston 236 is in sealed engagement with the lower chamber 224 and is rotatably journalled on the counter-turned lower end of stem 235. The lower piston 236 is locked in place on stem 235 by a retainer ring 237. By virtue of this arrangement, pinion 226 is rotatably journalled within the clutch cylinder 221 in axial alignment with the shaft 78.

During the shifting cycle with the reciprocator in operation, hydraulic pressure is applied to the upper chamber 223 by way of a hydraulic conduit 238 (FIGURE 19), thus shifting the teeth 230 of the pinion into mesh with the teeth 231 of the upper clutch element 196 to impart rocking motion to shaft 78. During this upward motion, hydraulic fluid is exhausted from the lower chamber 224 by way of a second hydraulic conduit 240, the conduits being interconnected in the control system, as explained later. After the shifting cycle is completed, hydraulic pressure is applied to the lower chamber 224 by way of conduit 240 and exhausted from the upper chamber 223 by way of conduit 238, thus shifting the pinion downwardly to disengage the clutch teeth (FIGURE 18) for normal operation of the transmission system under power.

*Operation (Reciprocator)*

During the reciprocating cycle, fluid pressure is supplied to the cylinder assembly 192 by the conduit 241 (FIGURE 22) which communicates with the hydraulic control system. The fluid pressure advances by way of passageway 242 to the shuttle valve 204 and reversing spool valve 205. It will be understood at this point, that the shuttle valve 204 controls the position of the reversing valve 205 and that the reversing valve, in turn, supplies hydraulic pressure alternately to the opposite ends of cylinder 192 to reciprocate the piston 206. Thus, as the piston 206 moves forwardly from the position of FIGURE 21 to that of FIGURE 20, the stem 243 which projects from the rod 208 slides relative to the shuttle valve 204, the shuttle valve being latched in the position of FIGURE 21 by the spring-loaded detent ball 244 which engages one of the detent grooves 245 of the shuttle valve.

During this forward motion of the piston (with the valves in the position of FIGURE 21) hydraulic pressure advances from passageway 242 to the groove 239 of reversing spool 205. The cylinder assembly is provided with a passageway 246 (indicated by a broken line) which leads from groove 239 to the rearward chamber 247 of cylinder 192, thus shifting the piston forwardly. During this stroke (FIGURE 21) fluid pressure is also applied from passageway 242 to the groove 248 of spool valve 204. The valve block is provided with another internal passageway 250 which leads from the groove 248 to the forward end 251 of the bore which slidably confines reversing valve spool 205. The shuttle valve 204 thus shifts and holds the reversing spool 205 in the position of FIGURE 21 during forward piston motion.

During the forward motion of the piston 206 (FIGURE 21), hydraulic fluid is exhausted from the forward chamber 249 of cylinder 192 by way of conduit 252 which extends through the cylinder assembly and leads to a groove 253 of reversing spool 205. Groove 253 (in the position of FIGURE 21) communicates with an annular groove which leads to an exhaust port 254, adapting the exhaust fluid to flow from the forward chamber 249 during forward piston motion. It will be understood at this point, that the drill head 6, in which the reciprocator is mounted, forms a sump adapting the exhaust fluid to be discharged directly from the exhaust port 254 for gravity flow to the sump, thus eliminating exhaust conduits.

As the piston 206 approaches the forward end of chamber 249 (cylinder 192) the collar 256 of stem 243 engages the internal shoulder 255 of shuttle valve 204, so as to shift shuttle valve forwardly to the position of FIGURE 20. At this point, detent ball 244 engages the second detent groove 245 to latch the shuttle valve 204 in the position of FIGURE 20. Hydraulic pressure now advances from passageway 242 to the groove 257 (FIGURE 20) of shuttle valve 204. Groove 257 communicates with an annular port leading to an internal passageway 258 which extends to the rearward end 260 of the bore of reversing spool 205. The fluid pressure thus shifts the reversing spool 205 forwardly, while the hydraulic fluid from the forward end 251 of the spool is exhausted by way of internal passageway 250. Passageway 250 leads to an annular port which now communicates with the groove 248 of shuttle valve 204. Groove 248 establishes communication with a second exhaust port 261, which exhausts the fluid from the assembly.

As soon as the reversing spool 205 shifts forwardly (FIGURE 20) fluid pressure advances from supply passageway 242 to the groove 253 of spool 205. Groove 253 now communicates with an annular port leading to the internal passageway 252, which communicates with the forward chamber 249. Accordingly, as soon as the collar 256 shifts the shuttle valve 204 to its forward position, the hydraulic circuit is reversed to start the piston back toward its retracted position. During the rearward motion of piston 206, the hydraulic fluid is exhausted from the rearward chamber 247 of the reciprocator cylinder by way of the internal passageway 246 leading to an annular port now in communication with groove 239 of spool 205 (FIGURE 20). Groove 239 communicates with the exhaust port 261 which advances the exhaust fluid to the sump.

As the reciprocator piston 206 approaches the rearward limit of its stroke, the shoulder 262 of stem 243 engages the intermediate wall 255 of shuttle valve 204, thus shifting the shuttle valve rearwardly to the position of FIGURE 21. At this point, the reversing spool 205 is shifted hydraulically to the rear (FIGURE 21) so as to re-establish the hydraulic circuit for shifting the piston 206 forwardly. The reciprocation of the piston is thus sustained so long as hydraulic pressure is supplied by way of the conduit 241. The rate of reciprocation depends upon the pressure and volume of the hydraulic supply system, the frequency preferably being slightly less than one stroke per second.

*Speed and Feed Selector Valve*

Described generally with reference to FIGURES 9 and 10, the spindle speed and feed control valve comprises a group of spindle speed control spools, indicated at 263, and a group of feed control spools indicated generally at 264. Both sets of spools are slidably mounted within bores formed in a common valve block 265, which is mounted in the housing 23. The position of the several speed control spools is regulated by the speed selector dial 17 and the position of the feed control spools is regulated by the feed control dial 18, as previously noted. Hydraulic pressure is circulated through the valve block 265 by way of the conduits indicated generally at 266, these conduits being referred to later with respect to the hydraulic circuit diagram. In order to facilitate the installation of the valve and conduits, these is provided a terminal block 267 through which the conduits 266 are interconnected with conduits 268 which lead to the hydraulic pump and also to the respective cylinders of the feed and speed transmission.

In addition, a push button selector valve, indicated generally at 270 is also mounted in the housing 23 and includes conduits 266 leading to the terminal block 267 and communicating with the conduits 268. The free spindle push button 24, rotary selector knob 26, and the push button 25 (FIGURE 32) are mounted in the valve block 270.

Referring now to FIGURES 33-41, the axially shiftable spools or plungers 263 and 264 are duplicates of one another, each plunger being adapted to be shifted to two or three different positions, as explained later. Each plunger is slidably confined in a respective bore 271 formed in block 265, the block having internal passageways communicating with the conduits 266. In the case of the three-position cylinders, which actuate the three-position cylinders of the transmission, three conduits lead from the valve block 265 to the cylinders to provide the forward, reverse or intermediate position of the shifter piston, the structure of which is described later. In the case of the two-position cylinders, two conduits lead from the valve block to each two-position shifter cylinder.

It will be understood that the five shifter cylinders of the speed change transmission are regulated by the five valve spools 263 (FIGURE 38), while the four shifter cylinders of the feed transmission are controlled by the four spools 264. The spools 263 combine with one another to provide the thirty-two spindle speeds, while the four feed control spools 264 combine with one another to provide the sixteen feeds, as explained earlier with reference to the transmission systems.

The movements of the valve spools are controlled by respective pairs of cam plates, one for the feed control spools 263 and the other for the feed control spools 264. As shown in FIGURE 10, the cam plates 272 and 273 are keyed to the rotatable shaft 274 of the speed selector dial 17 and the cam plates 275 and 276 are keyed to the shaft 277 of the feed selector dial 18.

As shown in FIGURES 38-41, the cam plates are provided with groups of apertures 278 which are arranged in radial line patterns extending from the centers of shafts 274 and 277. Each of the valve spools 263 and 264 are provided with an outwardly projecting stem 280 adapted to enter one of the apertures 278 in accordance with the rotary position of the associated cam plate. As viewed in FIGURE 40, certain of the apertures 278 pass through the first plate 273 or 276, as indicated for example at 281. Certain other apertures pass through both plates as indicated at 282 in FIGURE 40.

When the speed or feed selection is to be made, the cam plates are shifted outwardly away from the stems (FIGURE 38) then as the plates approach the stems, hydraulic pressure is applied to the ends of the spools 263 and 264 to shift the spools toward the plates. As the plates approach the ends of the stems 280, certain of the stems, in accordance with the speed and feed selection, will register with the matching apertures and will thus be shifted to the forward position as indicated at 283 (FIGURE 40). The stems of other spools will register with the blind holes 281, thus positioning the spools in the intermediate position as indicated at 284. Other stems will engage the surface of the plates which are devoid of apertures, thus positioning the spools in the rearward position, as indicated at 285. The hydraulic circuit provided in the several positions of the spools is explained later.

In order to align the pattern of apertures accurately with respect to the stems of the valve spools, the dial shafts 274 and 277 (FIGURES 32 and 33) are provided with respective detent wheels 286 and 287. These wheels are keyed as at 288 to the respective shafts and are provided with teeth 289 in registry with the radial groups of apertures. Each detent wheel includes a detent roller 290 journalled as at 291 in a slide block 292 (FIGURE 32). Each block is slidably mounted in a holder 293 which is attached to the housing 23 adjacent the associated detent wheel, the block and its roller being urged by a compression spring 294 toward the wheel. As the knobs 17 and 18 are rotated to select a speed or feed, the associated roller 290 is shifted counter to its compression spring 294 so as to provide a detent action at each selection.

In order to prevent the selector knobs from being rotated during a shifting cycle, each holder 293 includes a hydraulic piston 295 slidably sealed in the bore 296 within the holder and engageable with the projecting portion 297 of block 292. Hydraulic pressure is applied to the top of the piston by way of passageway 298, whereby the piston compresses the spring 294 and engages the projection 297 to lock the roller firmly into engagement with the detent teeth.

After the selector dials 17 and 18 have been rotated to a selected position (with the cam plates shifted to the outermost position of FIGURE 38), hydraulic fluid pressure is applied by way of the internal passageway 300 (FIGURE 33) to the forward end of the respective cam cylinders 301—301 formed in the valve block 265 to shift the cam plates toward the position of FIGURE 40. For this purpose, the dial shafts 274 and 277 are each provided with a piston 302 slidably engaged in the respective cylinders 301. The forward end of each cylinder 301 includes a head 303 slidably engaging and sealing the shafts 274 and 277. In order to permit the shafts 274 and 277 to rotate freely relative to the pistons 303, the inner ends of the shafts are journalled in ball bearings 304 (FIGURE 36). Each bearing 304 is confined in the piston by a retainer ring 305 threaded into the piston, the shaft being provided with a nut 306 engaging the inner race of the bearing.

In order to impart uniform movement to both sets of cam plates, each set is provided with a circular follow plate 307 (FIGURE 38) having a semi-circular groove 308 formed in the periphery thereof. A ball 310 rotatably interfits the groove 308 and is rotatably confined in a ball retainer 311. The retainer 311 includes a threaded stud passing through a slide plate 312 having opposite ends slidably carried on the shafts 274 and 277. A nut 313, threaded on the stud, secures the slide plate 312 to the retainer. The ball 310 offers no interference with the rotary motion of the cam plates as the dials are rotated to the selected speed and feed; however, the ball prevents the cam plates from moving at different speeds due to frictional resistance or variations in fluid pressure to the cylinders 301—301.

The cam plates and slide plates 312 move with the shafts 274 and 277, being locked axially with respect to shafts by means of snap rings 314 (FIGURE 39) which are engaged in grooves machined in the shaft. However, during axial motion of the shafts, the dials 17 and 18 and detent wheels 286 and 287 remain stationary, the shafts being slidable relative thereto. For this purpose, each dial includes a mounting sleeve 315 (FIGURE 33) which is journalled in the forward wall of the housing 32 (not shown) and locked against axial motion. The detent wheels 286 and 287 are locked against axial motion by snap rings 316—316 engaged in grooves formed in the sleeves 315. The shafts 274 and 277 are slidably keyed to the sleeves 315, as previously indicated at 288, such that the dials and cam plates remain stationary during the axial motion of the dial shafts. It will be understood that the cam plates assume the outward position (FIGURE 38) during a machining operation, permitting the operator to preselect the next speed and feed at any time while the machine is running, or even when it is stopped if the selector valve is set for push button shifting.

During the shifting cycle, the cam plates are first shifted toward the valve block, as indicated by the arrows in FIGURE 38 (internal hydraulic passageway 300—FIGURE 33) the fluid being exhausted from the rearward ends of the cylinders by way of the passageways 318. Thereafter, hydraulic pressure is applied to the rearward ends of the bores 271 of the valve spools 263 and 264 by way of the internal passageways 320 (FIGURE 38) which communicate with the ports 319 of the shifter cylinders 301. The ports 319 are uncovered when the pistons 302 reach their rearward position such that the valve spools are shifted under pressure toward the cam plates after the pistons retract. The apertures and abutment surfaces of the cam plates thus provide positive stops for locating the spools accurately with respect to the valve ports which are formed within the valve block. The valve spools and ports provide forward and reverse fluid flow and are directly connected to the shifter cylinders to shift the gear clusters to the required positions.

After the reciprocating and shifting cycle is complete, hydraulic pressure is applied by way of conduits 321 (FIGURE 33) to the passageways 318 to shift the cam plates outwardly to the position of FIGURE 38, the hydraulic fluid being exhausted from the opposite end of the cylinders 301 by way of the passageways 300, through the hydraulic circuit. Each of the valve spools 263 and 264 is provided with a spring and hydraulically loaded friction plug 322 (FIGURE 37) slidably mounted in a bore formed in the valve block and having an end engaging the periphery of the valve spool. After the several spools have been shifted to the positions in accordance with the setting of the cam plates (FIGURE 40) the hydraulic pressure by way of passageways 320 is released. The hydraulically loaded plugs 322 (energized through ports 325 and passageway 309—FIGURE 33) are arranged to hold the spools in the selected positions, when the cam plates are shifted outwardly to the position of FIGURE 38. The springs have been provided for assembly and shipping purposes.

As noted earlier, the valve spools 263 (speed control) and 264 (feed control) are duplicates of one another for manufacturing expediency. These spools control both the two-position and three-position gear shifting cylinders, through the hydraulic circuit as noted earlier. Those spools which actuate the three-position cylinders are shifted to three different positions by the cam plates, and those which actuate the two-position cylinders are shifted to two-positions by the cam plates.

The valve spools indicated at 3S are three-position plungers which actuate the spindle speed shifter cylinders and free spindle cylinder (FIGURE 38). The spools indicated at 3F are three-position plungers which actuate the shifter cylinders of the feed transmission. The spools which are indicated at 2S actuate the two-position cylinders of the spindle speed change transmission and the plungers indicated at 2F actuate the two-position cylinders of the spindle feed change transmission.

Each spool essentially comprises a reversing valve supplying pressure to one portion of a shifter cylinder and exhausting the pressure from an opposite portion. Thus, in the case of the three-position cylinders, the spool, in one position, supplies pressure to one end of the cylinder while exhausting from the opposite end to shift the piston to either of its extreme positions. To centralize the piston (three-position) the spool supplies fluid pressure to the opposite ends of the cylinder and exhausts the fluid pressure from a mid-portion of the cylinder. In the case of the two-position cylinders, the spool simply supplies pressure to one end of the cylinder while exhausting from the opposite end.

One of the three-position spools, together with the ports of the valve block, is shown in FIGURE 35 by way of example. It will be noted in this view that the valve block is provided with a manifold section 323 for connecting the conduits 266, as previously noted with reference to FIGURES 9 and 10, the manifold being secured in place by screws 324 (FIGURE 33). Fluid pressure is supplied to the manifold 323 by way of the pump passageway 325 (FIGURE 3) to which the pump conduits 326 (FIGURE 9) are connected. The valve block includes a longitudinal passageway 327 (FIGURES 33 and 35) having branch passageways 328 communicating with each valve spool 263 and 264.

In the spool position shown in FIGURE 35, hydraulic pressure is supplied to each groove 329 which communicates with a port 330. This port conducts fluid pressure to one end of one of the three-position shifter cylinders, as explained later. The port 331 communicates with the mid-point of the three-position cylinder. It will be noted that the groove 332 of the spool is in alignment with port 331 and that the spool includes an aperture 333 leading to an internal bore. Hydraulic fluid from the center of the three-position cylinder thus flows into the aperture 333 and is exhausted by way of the aperture 334 of groove 335, which communicates with the exhaust port 336. The opposite end of the three-position cylinder is connected to the port 337 which communicates with groove 338 having an aperture 340 also communicating with the exhaust port 336. It will be seen therefore that the three-position cylinder of the plunger shown in FIGURE 35 will have been shifted to one limit of its stroke.

When the valve spool is shifted outwardly to an intermediate position, groove 332 will be aligned with the pressure port 328, and the aperture 333 thereof will advance fluid pressure to the port 337 which leads to the opposite end of the three-position cylinder. In this position, the other two ports 330 and 331 will communicate with the exhaust port 336 to permit movement of the shifter piston in the opposite direction.

In the fully extended position of the valve spool, the pressure port 328 will communicate with groove 341 so as to supply fluid pressure to the port 331 which communicates to the center portion of the three-position cylinder, thereby to shift the piston to its intermediate or centralized position. In this case, the ports 330 and 337 will communicate with the exhaust ports 336.

The two-position spools are similar; however, in this case, the port 337 is omitted and the valve is simply shifted to two positions. Thus, in the position shown in FIGURE 35, the fluid pressure is advanced from pressure port 328 to the port 330 (groove 329) and exhausted by way of port 331 to the groove 341 to one of the exhaust ports 336, thus shifting the piston to one limit of its stroke. In its second position, the valve spool is fully extended so as to connect the pressure port 328 with the port 331 by way of the groove 341. In this position, the second port 330 communicates with the exhaust port by way of grooves 332 and aperture 333, thus shifting the two-position piston to its second position.

*Push Button Shifter Valve*

As noted above, the push button shifter valve 270 (FIGURE 9) is mounted in the housing 23 of drill head 6 adjacent the speed and feed selector valve 265. The free spindle push button 24 (FIGURES 32 and 42) which uncouples the spindle from the transmission, and the manual shift push button 25, which initiates the shifting cycle independently of the start lever 27, are shiftable axially relative to the valve block 270. The selector knob 26, which conditions the hydraulic circuit for automatic operation (start lever 27) or manual control (push button 25) is mounted for rotary motion in selecting push button or automatic control of the transmission (FIGURE 32).

In general, when the selector knob 26 is in the push button position, the free spindle push button 24 and the manual push button 25 are hydraulically locked in their normal extended position (FIGURE 42) while the machine is running (with lever 27 shifted to forward or reverse) so as to prevent shifting of the gears. On the other hand, when the machine is stopped with the manual lever 27 shifted to its neutral or stop position, either of the push buttons 24 or 25 may be depressed. In this case, the manual lever 27 is hydraulically locked in the stop or neutral position, so as to prevent power from being applied to the transmission until the shift has been completed. However, if neither of the push buttons is depressed when the machine is shut down, then the lever 27 can be manually shifted into forward or reverse without interference.

Described with reference to FIGURES 42–50, the free spindle push button 24 includes a stem 342 projecting outwardly through the indicating plate 343 (FIGURE 32). The stem includes a valve spool 344 slidably mounted in a bore of the valve block 270. The valve block includes a manifold plate 345 attached by screws 346. The block 27 includes channels 347 covered by the plate 345; these channels complete the hydraulic circuit to the several components of the valve. A snap ring 348 (FIGUURE 44) confined in a groove in the outer end of the bore, limits the outward motion of the spool 344 (FIGURE 44). A plug 350, engaged against the snap ring 348 seals off the rearward end of the bore.

The spool is normally urged to its forward position by means of hydraulic pressure introduced into the rearward end of the bore by way of passageway 351. Fluid pressure is supplied to the passageway 351 by a conduit 352 (FIGURE 42) which communicates with one of the channels 347 of the manifold plate leading to the port 351, as indicated in broken lines in FIGURE 44. Fluid pressure is supplied to the conduit 352 by way of the hydraulic circuit, as explained later.

When the free spindle push button is depressed (FIGURE 48), the hydraulic fluid is exhausted from the rearward end of the bore by way of port 351 and conduit 352. In the fully depressed position of the push button 24 (FIGURE 48), the rearward end of the push button valve spool 344 engages the plug 350. In this position, the groove 353 of spool 344 interconnects the port 354 with the port 355. The port 355 communicates with a conduit 356 (FIGURE 42) by way of one of the channels 347 of the valve block. The port 354, which is now interconnected with the port 355 (valve spool in depressed position), communicates with channel 357 which leads to a conduit 358. Conduit 358 is connected to the three-position free spindle floating cylinder 115 (FIGURE 14A) through the hydraulic circuit, the arrangement being such that the cylinder is shifted to its intermediate portion when the push button valve 24 is depressed, thus shifting the clutch and gear element 111 to its intermediate position (FIGURE 4) when the push button is depressed.

As mentioned earlier, the free spindle push button 24 is hydraulically locked in its extended position of FIGURE 42 while the machine is running, hydraulic pressure being supplied to the rearward end of the spool 350 by the conduit 352 through the hydraulic circuit, as explained later. In general, the circuit supplies hydraulic pressure to conduit 352 when the control lever 27 is shifted in either direction from its neutral position thus making it impossible to shift the clutch element 111 to its disengaged position while the machine is running.

When the push button 25 is in its extended position (FIGURE 44) port 355 (conduit 356 communicates by way of the groove 359 of spool 344 with an exhaust port 360 which permits fluid to be exhausted from the floating cylinder 115 when it is shifted in either direction from the neutral position shown in FIGURE 14A. Exhaust port 360 discharges the exhaust fluid from the cylinder 115 to the sump within the drill head, through the hydraulic circuit, as explained later.

It will be understood at this point that when fluid is introduced by way of conduit 358 through the circuit to the centering port of cylinder 115 (FIGURE 14A), pressure is also supplied to a hydraulic latch as explained later to lock the manual lever 27 in its neutral or stop position. The free spindle push button 24 is shifted outwardly from its depressed position after the shifting cycle, as explained later, adapting the clutch element 111 to be shifted into driving engagement with the spindle for the high or low speed drive.

The push button 25, which provides manual gear shifting is also depressed hydraulically during the shifting cycle, when the selector knob 26 is set for automatic operation. The push button valve 25 (FIGURES 42–47) permits the operator to initiate the gear shifting cycle manually, as mentioned earlier. To provide push button operation, the rotary selector knob 26 (FIGURE 32) must first be rotated from the "AUTO. SHIFT" position into registry with the push button shift reference line 28.

It will also be recalled that the manual lever 27 must be shifted to its neutral or stop position to permit operation of the shift button 25. It will be understood at this point, that the shift button 25 is of sectional construction and is arranged to provide a servo-motion under hydraulic pressure to eliminate resistance as it is depressed manually from the position shown in FIGURE 44.

When operating under push button control, the desired spindle speed and feed rates are selected by rotating the dials 17 and 18, then the push button 25 is depressed. This causes the cam plates to be shifted toward the valve spools of valve block 265, as explained earlier, and also energizes the reciprocator mechanism 191, thereby to impart reciprocating motion to the gear trains. After a time delay, hydraulic fluid is supplied to the valve block 265 to energize the shifter cylinders in accordance with the selected speed and feed, so as to shift the gears. At the end of the shift cycle, the manual lever 27 is hydraulically unlocked permitting power to be applied in forward or reverse directions to the transmission so as to drive and feed the spindle.

Described with reference to FIGURES 48–50, the push button 25 comprises a main valve spool 361 including an axial bore 362 in which is slidably mounted a control stem 363, normally residing in the position shown in FIGURE 48. When the push button 25 is depressed, stem 363 is shifted inwardly (FIGURE 49) counter to the compression spring 364. Upon being shifted inwardly, fluid pressure flows by way of port 365 (FIGURE 50) to groove 366 of spool 361, and by way of port 367 into the bore 362 of the main spool. From bore 362, the fluid passes through ports 368 to the chamber 370 at the outer end of the main spool, which is sealed off as at 371, thus forcing the main spool inwardly to the shifting position, as shown in FIGURE 50. The fluid pressure is supplied to the port 365 by conduit 372 (FIGURE 42) which extends from the hydraulic circuit, as explained later. As the main spool 361 is shifted inwardly, the hydraulic fluid is exhausted from the rearward chamber 373 by way of a channel 374 which leads to the groove 275 of a timer cylinder 376. The groove 375 of the timer piston communicates with an exhaust port 377.

When the main spool 361 is shifted inwardly (FIGURE 50) the groove 366 of the main spool provides communication from the pressure port 365 to the channel 378 (FIGURE 49) which leads to the conduit 380 (FIGURE 42). Conduit 380 is interconnected in the hydraulic circuit to initiate the shifting cycle. Hydraulic fluid is also advanced by way of conduit 381 (FIGURE 42) and port 382 (FIGURES 42, 48 and 49) to the forward end of the timer piston 376 to shift the piston inwardly, counter to the compression spring 383.

In order to provide a time delay to permit shifting of the gears and other components and to provide operation of the reciprocator 192, the conduit 381 includes a metering valve 384 (FIGURE 42) which restricts the flow of hydraulic fluid and thus retards the motion of the timer piston 376. The metering valve 384 is conventional including an adjustable needle valve for metering the flow in the direction indicated by the arrow. The device includes a ball check providing an unobstructed flow in the opposite direction. As the timer piston 376 shifts toward the right, hydraulic fluid is exhausted from its opposite end by way of the conduit 385 (FIGURE 42) which also leads to the hydraulic circuit.

As the time delay piston 376 moves toward the right, it uncovers a port 386 (FIGURE 49) communicating with a channel 387 leading to a pair of outlets 388—388 (FIGURE 42) such that fluid pressure passes from the port 382 on the left end of the timer piston 376 to port 386. The outlets 388 (port 386) communicate with respective conduits 389 leading to the dial lock cylinders 296 (FIGURES 32 and 51) which latch the selector dials 17 and 18 against rotary motion during the shifting cycle. As the time delay piston 376 continues its motion to the right, it uncovers the port 390 (FIGURE 49) of supply conduit 352 (FIGURE 42) whereby the piston blocks off exhaust port 377 and establishes communication between port 390 and port 391, which leads to passageway 374. Passageway 374 leads to the port 351 at the right end of the free spindle push button 24 and also to the port 392 at the right of the shift button 25, thus shifting the push button 25 to its extended position and ending the shifting cycle.

The rotary selector knob 26 is shown in FIGURES 44–47 rotated to the "P.B. SHIFT" position (push button shift position). This valve includes a rotary spool 393 having an axial bore 394 (FIGURE 46) communicating with a pair of radial bores 395 and 396. As shown in FIGURE 46, a branch passageway 397 registers with the radial bore 395 when knob 26 is shifted to the "AUTO. SHIFT" position. Branch passageway 397 leads to a channel 399, which communicates with conduit 381 (FIGURE 42). Radial bore 396 registers with a similar branch passageway 398 which leads to a channel 400 to conduit 372. When the valve is in the push button position shown in these views, the branch passageways 397 and 398 are blocked off, such that the fluid pressure is available to provide operation under control of the "P.B. SHIFT" button 25. When the knob 26 is rotated through a quarter turn to the "AUTO. SHIFT" position, the radial bores 395 and 396 are shifted to a second position into alignment with the branch passageways 399 and 400, thus exhausting the hydraulic fluid from the passageways 400 and 399 by way of the exhaust port 401 (FIGURE 46). As explained with reference to the hydraulic circuit, the shift button 25 is depressed by hydraulic pressure when the knob 26 is rotated for automatic shifting. In this case, the cycle is controlled by the time delay piston 376 in the manner described above.

In order to hold the rotary valve spool 393 firmly in the automatic or push button position, there is provided a toggle spring 402 (FIGURES 43 and 45) anchored as at 403 to a collar 404 attached to the rearward end of the spool. The opposite end of the spring is anchored to a pin 405. A stop pin 406 projects radially from the collar and engages the pins 407 and 408 at the limits of rotary motion of the valve 26.

*Start and Stop Valve*

The start and stop valve, indicated previously at 200, (FIGURES 23–29) is mounted upon the manifold plate 197 which is attached to the bottom plate 201 adjacent the reciprocator cylinder 192, as described previously with reference to FIGURES 17 and 18. As noted previously, the manifold plate 197 is channelled as at 198 to interconnect the various components of the hydraulic system with the start and stop valve.

Described in detail (FIGURE 23) the valve 200 is bolted as at 410 to the manifold plate 197 and includes a cylindrical bore 411 in which is mounted a valve spool 412. A compression spring 413, seated against a piston 414, urges the spool 412 toward a sector plate 415 which is keyed to the shaft 39 of the start and stop lever 27 (FIGURE 24). The outer end of spool 412 is slotted as at 416 and includes a roller 417 which is journalled as at 418 to the spool 412. The sector 415 includes a V-shaped notch 420 which acts as a cam with respect to the roller 417.

In the neutral or braking position of FIGURE 23, the roller is seated in the notch 420, such that the spool 412 is urged by the spring to its outward position. When the lever 27 is shifted to the forward or reverse position, as in FIGURE 26, the notch 420 cams the roller and valve spool inwardly to the position of FIGURE 25. When the lever 27 is shifted to the braking or neutral position of FIGURE 24, the forward and reverse clutches 33 and 34 (FIGURE 5) are disengaged and hydraulic fluid pressure is advanced from the valve 200 to the brake cylinder 42 (FIGURE 5) so as to bring the gear trains to a stop.

As noted earlier, the lever 27 is hydraulically locked in the braking position (FIGURE 24) when either the free spindle push button 24 or shift button 25 is depressed. For this purpose, the fluid pressure is applied by way of passageway 422 (FIGURE 23) so as to force the piston 414 forwardly counter to spring 413 and into engagement with the rearward end of valve spool 412. Fluid pressure is exhausted from the opposite side of the piston by way of an exhaust passageway 409. This forces roller 417 firmly into engagement against the surfaces of the V-shaped notch as to center the sector 415 in the braking position. Thereafter, fluid pressure is advanced by way of conduit 419 (FIGURES 30 and 31) to the upper end of the shot bolt cylinder 423. The shot bolt cylinder 423 includes a piston 424 (FIGURE 31) secured to the shot bolt 425. The lower end of cylinder 423 includes a collar 426 in sealed engagement with the projecting end of the shot bolt. The upper portion of the bolt is slidably confined in a sleeve 427 attached to the upper portion of cylinder 423.

The shaft 39 of the lever 27 includes an arm 428 adapted to receive the lower end of bolt 425, such that the bolt 425 locks the lever positively in its braking position. When fluid pressure is introduced into the cylinder 423 by way of conduit 419, the fluid is exhausted from the lower end of the cylinder by way of the conduit 430.

After the shifting cycle is completed, fluid pressure is advanced by way of conduit 430 (FIGURE 30) to the lower end of cylinder 423 so as to elevate the shot bolt 425 to its disengaged position. Under these circumstances, the piston 414 (FIGURE 23) resides in its retracted position (the selected gears having been shifted) such that the start and stop lever 27 may be shifted to its forward or reverse position to apply power to the transmission.

As shown in FIGURES 23 and 25, the valve spool 412 includes two control grooves 431 and 432, which interconnects the sets of ports and passageways communicating with the channels 198 of the manifold plate 197 as mentioned previously with reference to FIGURE 17. Thus, as shown in FIGURES 17 and 25, the passageway 433 communicates with one of the valve grooves 431 which supplies pressure from the pump 99 (FIGURE 8), while the passageway 434 communicates with a passageway 435 which leads to line 372 (FIGURE 51). The pair of passageways 433 and 434 are thus interconnected by the groove 431 (FIGURE 23) when the hand lever 27 is in the neutral braking position. The push button valve 270 supplies hydraulic pressure to the reciprocator as explained later with reference to the hydraulic circuit.

The valve groove 432, in the position of FIGURE 23, interconnects the port and passageway 436 (FIGURE 17) to an exhaust hole 339 in one side of the start and stop valve. The passageways 438 and 440 are arranged to provide a manifold for the free cylinder circuit. The passageways 409 and 422 shift the piston 414 inwardly to center the lever 27 in its neutral position before it is latched by the shot bolt, as explained earlier.

Referring to FIGURE 28, the brake passageways 436 and 437 communicate with a relay valve spool 441 (FIGURE 29) which is spring loaded as at 442 toward the right. In the neutral position of the start and stop valve (FIGURE 23), fluid pressure is advanced to passageway 444 (FIGURE 29). From passageway 444, oil pressure passes across the groove 443 of the relay spool to an oil passageway 445 which communicates with a conduit leading to the brake cylinder 42, as explained later with reference to FIGURE 51.

It will be understood at this point, that the brake is applied momentarily when lever 27 is shifted to neutral and is released thereafter in order to permit operation of the reciprocator during the shifting cycle. The brake is released as the time delay piston 376 begins its timing motion toward the right (FIGURES 48 and 49). For this purpose, the cylinder of the time delay piston has a port which communicates with the bore of the relay spool 441 so as to shift the spool toward the left, counter to its spring 442. As shown in FIGURE 29, the valve block 200 includes a longitudinal passageway 446 which communicates with the above noted port of the time delay cylinder, such that oil pressure is introduced at the right end of the brake relay spool as the timer piston 376 begins to time out, thereby shifting the relay spool 441 toward the left.

In its left hand position, the relay spool blocks off the pressure passageway 444, and the groove 443 of the spool provides communication between passageway 445 to a vent passageway 447. Since passageway 445 is in communication with the brake cylinder 42, the spring-loaded brake piston shifts to brake release position, the oil being exhausted through the groove to the vent passageway 447. After the brake is released, the timer piston energizes the reciprocator and sequentially advances the apparatus through the shifting cycle.

Shifter Cylinders

As noted earlier, the two-position shifter cylinders of the speed and feed change transmission, for example, cylinders 153 and 168 of FIGURE 7, are of conventional design, each including a piston 448 which is shifted in forward or reverse directions by applying fluid pressure to the forward or rearward end of the cylinder, as explained later with reference to the hydraulic circuit. In addition to the two-position cylinders, the feed transmission includes the two three-position cylinders 129 and 136 (FIGURE 7) while the speed transmission includes the three three-position cylinders 72 and 73 (FIGURE 8) and 115 (FIGURE 6), the latter of which provides free spindle motion. The three-position cylinders of the speed and feed transmissions are duplicates, the cylinders 72 and 73 being detailed in FIGURES 14-16. The following description therefore applies to all the three-position cylinders, except the floating cylinder 115 which is detailed in FIGURE 14A.

As noted earlier (FIGURE 8) the cylinders 72 and 73 are attached to the mounting plate 74 which is secured to the housing 30. Each cylinder (FIGURE 14) includes a piston rod 449 having a piston 450 slidably confined in a sleeve 451, the sleeve being pinned as at 452 to its cylinder 72 or 73. Each piston includes a pair of floating sleeves 453—453 located on opposite sides of the sleeve 451 and slidable in the bore 454 of the respective cylinders at opposite ends thereof. When hydraulic fluid is applied at opposite ends of the bore 454, then floating sleeves 451 engage the piston 450 at opposite sides (cylinder 73—FIGURE 14) thus shifting the yoke to its centralized position. Each cylinder includes exhaust ports 455 for exhausting the trapped fluid when the sleeves are centralized.

When hydraulic pressure is applied to the right side of the piston, the piston rod and its yoke are shifted to the left (cylinder 72—FIGURE 14). When hydraulic pressure is applied to the left side of the piston, the piston rod and its yoke are shifted to the right (cylinder 72—FIGURE 16). The conduits and passageways for supplying and exhausting the hydraulic fluid with respect to the cylinders are indicated by the broken lines in FIGURES 14 and 16. It will be understood that three conduits lead to each cylinder, providing the intermediate and two extreme positions, the conduits being described later with reference to the hydraulic circuit.

As explained earlier, the pistons are provided with hydraulic interlocks which prevent two gear clusters on a given shaft from being meshed at the same time. Thus, the yoke 71 of cylinder 73 is shifted to its centralized or neutral position (FIGURE 14) to allow the piston of cylinder 72 to be shifted to the right or left. For this purpose, each piston rod 449 has an end portion 456 passing through an interlock valve 457, the rod 456 having grooves 458 which align with ports 460 in the centralized position of the piston. These grooves and ports control the supply of fluid pressure to the companion cylinder. Thus, in the position of FIGURE 14, the interlock valve of centralized cylinder 73 permits fluid pressure to be supplied to either end of the cylinder 72 while in the position of FIGURE 16, the interlock valve 457 of cylinder 72 (which is centralized) permits fluid pressure to be supplied to either end of cylinder 73.

The floating piston 115 (FIGURE 14A) which shifts the clutch element 111 (FIGURE 4), as explained earlier, is mounted in the lower portion of the drill head (FIGURE 6) and includes the yoke 114 engaging a groove formed in the element 111. The piston rod 462 has its upper and lower ends anchored as at 463 in bosses formed in the drill head, such that the cylinder 115 and its yoke 114 shift vertically along the piston rod, the cylinder being shown in its centralized or neutral position in FIGURE 14A.

Cylinder 115 includes a fixed internal sleeve 461 and a pair of floating sleeves 464 slidably mounted in the opposite end portions of the cylinder bore 465. Hydraulic pressure is applied by way of the flexible conduit 358 and passageway 466 to the opposite ends of the bore 465, thus forcing the floating sleeves against opposite ends of the fixed sleeve 461 and against opposite sides of the piston 467 to centralize the cylinder and its yoke 114. During this motion, fluid pressure is exhausted from opposite sides of piston 467 by way of ports 468—468 which lead to the axial bores 470—470 formed in the piston rod 462. The axial bores communicate with the conduits 471 and 472 which form a part of the hydraulic control system. When fluid pressure is supplied to either of the conduits 471 or 472, the cylinder is shifted upwardly or downwardly from the position shown, the fluid being exhausted by way of the conduit 358.

*Hydraulic Circuit and Operation*

Referring to FIGURE 51, the hydraulic pump 99 circulates oil under pressure to the several components of the hydraulic system and also lubricates the speed and feed change transmissions. The pump is connected to the sump of the drill head by a suction line 478 and forces the oil under pressure by way of line 480 to a relief valve 481. From the relief valve, excess oil is bypassed and advanced by way of line 482 to the lubrication system.

Oil under predetermined pressure for operation of the hydraulic system is fed from the relief valve by way of line 483 through a filter 484, and by way of line 485 to the manifold plate 197 which provides communication with the start and stop valve 200, and with the push button valve 270. Oil is also advanced from pressure line 485 and branch line 486 to a push button solenoid valve 487, which is connected by way of branch lines 488—488 to a head clamp cylinder 490. This cylinder actuates a clamping device which clamps the head to the arm; however, this apparatus forms no part of the present invention.

As noted earlier during a machining operation, the cam plates 273 and 276 (FIGURE 38) are shifted outwardly and the detent pistons 295 (FIGURE 32) are hydraulically released to allow the dials 17 and 18 to be rotated for preselecting the next speed and feed rates. When the operation is completed, the hand lever 27 is actuated to shift the start and stop valve 200 to the neutral or braking position indicated at FIGURE 51. In this valve position, oil pressure is advanced from the pressure line 485 to line 491 (one of the grooves 198 of manifold plate 197) so as to apply the hydraulic brake and mechanically disengage the forward and reverse friction clutches of the speed and feed transmission systems.

Assuming that the selector knob 26 (FIGURE 42) of push button valve 270 is set for automatic operation, oil will now be fed to the push button valve 270 to depress the push button 25, to shift the detent pistons 295 (cylinders 296) to locking position, to release the brake, and to energize the reciprocator 192. Finally, the cam plates 273 and 276 of the speed and feed selector valve 265 are shifted by oil pressure toward the valve spools, then the spools are shifted into engagement with the plates at the preselected positions, and the gears are shifted in accordance with the dial selections.

Described in greater detail, in the neutral or braking position of the start and stop valve 200 (FIGURE 51) oil pressure is advanced from the passageway 422 of the start and stop valve 200, to line 493 which leads to a T-fitting 494. From the T-fitting, oil pressure advances through the check valve 495 and by way of passageway 496 (FIGURE 42) to the port 382 (FIGURE 48) to shift the time delay piston 376 toward the right. As the piston shifts, pressure is introduced into passageway 387 (FIGURE 49) to depress the push button 25 by hydraulic pressure.

As the time delay piston 376 is shifted toward the right, oil is exhausted from the right end of the piston by way of the needle valve 497 and line 385 (FIGURES 42 and 43). The needle valve 497 meters the flow of the exhaust oil and regulates the rate of piston movement and thereby provides a necessary shifting time. It will be recalled that the oil pressure is supplied to the outer end of push button shift valve 25 by way of the time delay piston and passageway 387 (FIGURE 42) while the time delay piston is being shifted toward the right. Oil pressure from passageway 387 also flows by way of line 389 to the detent cylinders 296 to lock the dials (FIGURE 51).

When push button 25 is depressed hydraulically, oil pressure is supplied from the start and stop valve by way of a conduit 372 to the port 365, across valve groove 366 (FIGURE 49) to port 498 and passageway 378, which leads to the line 380. Line 380 supplies oil pressure to the reciprocator (line 241—FIGURES 22 and 51) and also to line 240, which engages the reciprocator clutch to set the gear trains in motion by operation of the reciprocator.

Line 240 also supplies oil pressure to conduit 419 (FIGURE 30) which shifts shot bolt 425 downwardly to lock the starting lever while shifting takes place. Oil from passageway 378 also flows through the valve 270, as indicated by the broken line (FIGURE 51) to line 500 and to T-fitting 494, to port 501 in manifold 197, through the manifold to port 422 (FIGURE 23) of the start and stop valve. This shifts the floating piston 414 toward the right to center the lever 27. This same oil continues on through the valve to the second channel 198 of the manifold and line 502 to the speed and feed selector valve 265 (passageway 300—FIGURE 33) to the cylinders 301 to shift the cam plates toward the stems of the valve spools.

As explained earlier with reference to FIGURE 33, the oil trapped behind the pistons 302 is exhausted by way of passageways 318 which lead to the exhaust lines 321. However, as the cam plates approach their final limit of inward travel, the pistons 302 uncover the ports 319 (FIGURE 40) which lead to the passageway 320. Passageway 320 communicates with the rearward ends of the valve spools, such that the oil pressure now forces the spools forwardly into positive engagement with the abutment surfaces of the cam plates, thus shifting the spools to their selected positions.

The oil which is exhausted by way of the passageway 318 to the line 352 passes into the port 390 (FIGURES 42 and 44), groove 375 of the time delay piston and is vented to the sump by way of the vent 377. As shown in FIGURE 49, this vent is sealed off in the final right hand position of the time delay piston so as to provide an interlock which prevents the cam plates from being shifted forwardly during the shifting cycle.

When the valve spools of the feed and speed selector valve are shifted into engagement with the abutment plates and assume their selected positions, oil pressure is supplied to the several shifter cylinders so as to shift the selected gears into mesh while they are being reciprocated. The oil pressure is supplied to the selector valve 265 by way of pump line 485 (FIGURE 51) and passageway 503 of the manifold plate 197 to the line 504 which leads from the manifold plate to the valve body. Line 504 branches to the inlets 325 and passageways 327 (FIGURES 33 and 35) which communicate with the ports 328 leading to the several valve spools. These spools direct the oil pressure to selected ports 330, 331 and 337 (FIGURE 35) which communicate with conduits leading to the two-position and three-position shifter cylinders. These lines are described later with reference to FIGURE 51. It will be understood that oil pressure is supplied to the selected cylinders at all times while the machine is running to hold the gears in meshing engagement, the actual shift being made as soon as the valve spools shift into engagement with the cam plates.

As noted earlier with reference to the start and stop valve 200 (FIGURES 23–29), the brake is applied each time the lever 27 is shifted to the neutral or braking position. It will be recalled that the brake relay valve 441 resides in its normal position (FIGURE 29) when the start and stop valve shifts to the neutral position (FIGURE 23) so as to apply fluid pressure by way of passageways 444, groove 443 and passageway 445 to the conduit 505 (FIGURE 51) which communicates with the brake cylinder 42 to apply the brake.

In order to release the brake (FIGURE 44) oil pressure flows from the push button valve 270 by way of line 493 through passageway 198 of the manifold plate (FIGURE 51), which connects with the longitudinal passageway 446 (FIGURE 29) at the right end of the relay valve 441, so as to shift the valve from the position of FIGURE 29 toward the left. As explained earlier, motion of the relay piston toward the left blocks off the pressure passageway 444 and connects the passageway 445 (conduit 505) with the vent passageway 447 to release the brake.

As the time delay piston 376 reaches its right hand limit of travel, its groove 375 (FIGURE 49) provides communication between the pressure port 506 and port 391, thereby conveying oil under pressure from line 372 (FIGURE 42) to the channel 374 which leads to the rearward ends of the push button valves 24 and 25 so as to shift them outwardly to non-shifting position. When the shift push button 25 reaches its extended non-shifting position, oil pressure is directed from line 372 (FIGURE 42) across groove 366 of push button 25 to port 354 to line 358 (FIGURE 51) which branches to line 240 and applies pressure to the cylinder 221 of the reciprocator clutch (FIGURE 19) to disengage the clutch element 234. Line 240 also branches to line 430 (FIGURE 31) to shift the shot bolt 425 to its unlocked position releasing the starting lever. The fluid pressure from these components is exhausted by way of line 238 (reciprocator clutch) and line 419 (shot bolt) and line 380 through channel 378, through the push button valve groove 379 of push button 25 to the vent passageway 507 to the sump (FIGURE 48). The control lever 27 may now be shifted to running position to apply power to the transmission system.

When the control lever 27 is shifted to the running position, the start and stop valve 200 introduces oil pressure to branch line 508 which leads to the T-fitting 510 and to the needle valve 497. The needle valve 497 provides a metering action to control the rate of motion of the timer piston 376 toward the right during the shifting cycle and provides free flow in the opposite direction. The oil pressure from line 508 thus shifts the timer piston to its starting position, as shown in FIGURE 44, thus conditioning the circuit for the next cycle of operation.

As shown in FIGURE 51, the pressure conduit 508 also communicates with the line 385 by way of the T-fitting 510, such that pressure is introduced through the line 385 to the speed and feed selector valve 265 when the timer piston is shifted to its left hand starting position. Line 352 communicates with the passageways 318 (FIGURE 33) leading to conduit 321 and to the rearward ends of the cylinders 301. Oil pressure is thus introduced into the cylinders in a direction to shift the pistons 302 and cam plates 273 and 276 outwardly (FIGURE 38) adapting the cam plates to be rotated by the dials 17 and 18 for the next speed and feed selection. During the movement of the pistons 302 outwardly, the oil trapped on the opposite side of the pistons is exhausted by way of the line 502.

When the selector knob 26 is rotated to the position for push button control, as shown in FIGURES 44–47, the channel 400 from conduit 372, through the axial bore 394 of rotary valve 393 to the passageway 399 and port 382 is blocked off so as to decommission the time delay piston 376, transferring the control of the machine to the push button 25. In this setting, the starting lever 27 may be shifted in either direction from the braking position to rotate the spindle in forward or reverse directions without energizing the gear shifting system. In other words, the hydraulic control system applies the brake when the lever is shifted to the neutral position and disengages the brake when the lever is shifted to its running position.

This setting is of particular advantage in tapping operations since the operator may conveniently feed in the tap and back it out without the time delay which takes place during the automatic shifting cycle. When a gear shift is to be made, the dials may be rotated in the usual way to the selected setting, whether the machine is running or stopped. After the dials are rotated to the new selection, push button 25 is depressed manually to shift the gears.

As described earlier with reference to FIGURES 49 and 50, a hydraulic servo-motion is brought about when the push button 25 is depressed manually, whereby the main spool 361 is shifted under hydraulic pressure for ease of operation. When the spool is shifted to the position of FIGURE 50, oil pressure is supplied to the time delay piston to start the shifting cycle, the sequence being similar to that disclosed above in relation to automatic operation. However, instead of providing oil pressure to the time delay piston through the rotary selector valve 393, the oil pressure is re-routed by way of line 380 (FIGURE 51) to line 500, through check valve 495 and passageway 496 to port 382 at the forward end of the time delay piston. As the piston is shifted toward the right at the controlled rate, the brake is released, the start and stop lever and dials are locked, and the reciprocator mechanism is activated and coupled to the transmission, as described above under automatic operation. Fluid pressure is also supplied to the line 502 to shift the cam plates and to shift the speed and feed spools to the selected positions causing the selected gears to be meshed.

When the free spindle push button 24 is depressed, the free spindle cylinder 115 shifts the coupling element 111 to the intermediate position (FIGURE 14A), as explained earlier. As shown in FIGURE 51, oil pressure is advanced from the start and stop valve by way of line 353 which communicates with the push button valve 270 through the start and stop valve 200. In order to re-engage the spindle, the shift button 25 must be manually depressed so that the machine will go through its normal shifting cycle.

From the line 353, the oil pressure passes by way of passageway 357 (FIGURES 48 and 49) to the relief groove 353 of the free spindle valve 342, normally blocking the flow. However, when the free spindle button is depressed, the groove 353 of the valve connects port 355 to port 354 which leads to line 356. From line 356 the oil pressure passes through the start and stop valve to the line 358 which leads to the flexible conduit to centralize the free spindle cylinder 115. The cylinder 115 (FIGURE 14A) is of the positive displacement type as noted earlier. During movement to the centralized position, the oil within the cylinder is bypassed from one end of the cylinder to the opposite end by way of the longitudinal passageway 466.

The pressure for shifting the gears advances by way of the pump line 504, through the ports of the several valve spools, as explained earlier with reference to FIGURES 33–41, to the several shifter cylinders. The several gears are held in mesh by oil pressure which is supplied constantly to the shifter cylinders while the machine is in operation. As noted earlier, spring-loaded detents 98 are provided for all gears on vertical shafts to prevent the gears from dropping out of position when the hydraulic pressure is shut down.

For shifting the three-position cylinder 72 of the speed change transmission (FIGURE 51) three lines, indicated at 511 are interconnected with the cylinder 72, two of the lines passing through the hydraulic interlock valve 457 as explained earlier. The three-position cylinder 73 is also actuated by the three lines 512, two of which also pass through the interlock valve 457.

The three-position cylinder 115 of the speed change transmission is shifted to its high or low range position by the two lines 471 or 472 leading from the selector valve 265. The cylinder is shifted to its intermediate or free spindle position by depressing the free spindle push button 24 which applies fluid pressure to the line 358 as explained earlier.

The two-position cylinder 85 of the speed change transmission is connected with the selector valve by the pair of lines 513. The second two-position cylinder 95 of the speed change transmission is connected to the selector valve by a pair of lines 514.

The three-position cylinder 129 of the feed change transmission is connected to the selector valve 265 by way of the three lines 515, two of which pass through the interlock valve 144 of the second three-position cylinder 136. The second three-position cylinder 136 is connected to the selector valve by the three lines 516, two of which also pass through the interlock valve 142 of the companion three-position cylinder 129. The two two-position cylinders 153 and 168 of the feed transmission are connected to the selector valve by the two pairs of lines 517 and 518.

We claim:

1. In a metal working machine having a rotating prime mover and a rotating element, mechanism for selecting the speed of rotation of the rotating element in relation to the speed of the prime mover, said mechanism comprising a variable speed transmission having a plurality of shiftable gears, gear shifting means adapted to mesh said gears with one another by axial movement in various combinations to provide different speed reductions, said transmission adapted to connect said prime mover to said rotating element, a brake adapted to stop the rotation of said gears, a selector valve, said selector valve having a selector element which is adapted to be rotated in a first plane and adapted to be shifted axially to a second plane, said rotary selector element adapted to be rotated while in said first plane to set the selected speed of rotation of the rotating element through operation of the gear shifting means, said rotary selector element, upon being shifted axially to said second plane, adapted to operate the gear shifting means, thereby to mesh said gears with one another in accordance with the rotary position of the rotary selector element, a lock for said rotary selector element adapted to prevent rotation thereof, reciprocator means for rotatably oscillating the gears of the transmission to facilitate meshing thereof, hydraulic power means for actuating the brake, the lock, the reciprocator means and the gear shifting means through a cycle of operation, starting means adapted to initiate said cycle of operation, and sequence control means interconnected with the hydraulic power means and adapted to cause sequential operation of said last mentioned means whereby, upon initiation of said cycle of operation by the starting means, the brake is engaged to stop the rotation of said gears and is released, the lock is actuated to lock the rotary selector element against rotary motion, the reciprocator means for oscillating the gears is energized, and the gear shifting means are actuated to shift the gears while the gears are being oscillated.

2. A mechanism as set forth in claim 1 in which the selector valve includes a plurality of shiftable valve elements adapted to energize the gear shifting means, combined with a shiftable cam element including abutment surfaces adapted to engage said valve elements for shifting the same, said cam element normally residing in spaced relationship to the valve elements, permitting said cam element to be rotated relative to the valve elements, and means adapted to shift said cam element into engagement with said valve elements, thereby to shift the selected gears into mesh with one another.

3. A mechanism as set forth in claim 1 in which the selector valve includes a plurality of axially shiftable valve spools adapted to energize the gear shifting means, combined with a shiftable cam plate including abutment surfaces adapted to engage said valve spools for shifting the same, said cam plate normally residing in spaced relationship to the valve elements, permitting the cam plate to be rotated relative to the valve spools, and a hydraulic device interconnected with the hydraulic power means and adapted to shift the cam plate into engagement with the valve spools while the gears are being oscillated, thereby to shift the selected gears into mesh with one another.

4. A mechanism as set forth in claim 1 in which the selector valve includes a plurality of axially shiftable valve spools adapted to energize the gear shifting means, combined with a shiftable cam plate including abutment surfaces adapted to engage said valve spools for shifting the same, said cam plate normally residing in spaced relationship to the valve elements, permitting the cam plate to be rotated relative to the valve spools, and hydraulic means interconnected with the hydraulic power means and adapted to shift the cam plate toward the valve spools and for shifting the valve spools into engagement with the abutment surfaces of the cam plate while the gears are being oscillated, thereby to shift the selected gears into mesh with one another.

5. A mechanism as set forth in claim 3 in which the transmission includes shiftable feed change gears adapted to impart feeding motion to the rotating element, combined with a second rotary selector valve adapted to select the gears to be shifted and having a second cam plate, and means interconnecting both of the cam plates and adapting the plates to be rotated independently of one another and shifted in unison relative to the valve spools.

6. A mechanism as set forth in claim 1 in which the lock for the selector valve comprises a detent wheel, a detent element adapted to engage said wheel, and a hydraulically operated device interconnected with the hydraulic power means and connected to said detent element, the hydraulically operated device being adapted to force the detent element under hydraulic pressure into engagement with the detent wheel whereby, upon initiation of the cycle of operation, the selector valve is locked against rotary motion.

7. A speed selector valve as set forth in claim 5 in which the selector valve comprising a valve body including a cylinder disposed along an axis parallel with the valve spools and the cam element includes a piston slidably mounted within said cylinder, and means for supplying and exhausting hydraulic pressure relative to the opposite ends of said cylinder, thereby to shift said cam element toward or away from the valve spools.

8. A speed selector valve as set forth in claim 5 in which the valve spools project axially beyond the valve body and in which the cam element includes a pattern of holes adapted to be rotated into registry with the ends of selected valve spools, whereby the surface of the cam plate and the holes thereof are adapted to position the spools axially within said valve body in selected positions.

9. A mechanism as set forth in claim 1 in which the selector valve comprises a valve body, a plurality of shiftable valve elements mounted in said valve body and adapted to shift said gears in response to the position of the valve elements, a rotatable cam element having a plurality of abutment surfaces adapted to be presented selectively to said valve elements for preselecting the gear changes, said cam element normally residing in spaced relationship to the valve elements, adapting the cam element to be rotated to a position for preselecting said gear changes, and actuating means adapted to shift the valve elements axially toward the cam element and into engagement with the abutment surfaces thereof, whereby the said valve elements are shifted axially relative to the valve body to positions determined by the abutment surfaces presented by the cam element.

10. A speed selector valve as set forth in claim 9 in which the valve elements comprise axially shiftable valve spools mounted in the valve body and wherein the cam element is provided with hydraulic means for shifting the same axially toward the valve elements when the valve elements are shifted toward the cam element.

11. A mechanism as set forth in claim 1 in which the starting means comprises a manually operated control lever adapted to provide a driving connection between the prime mover and variable speed transmission, a valve mechanically connected to said control lever, and adapted to initiate the cycle of operation when the control lever is shifted from a driving position to a neutral position, and a hydraulically operated locking device adapted to lock the control lever in the neutral position at the start of the cycle of operation.

12. A mechanism as set forth in claim 1 in which the starting means comprises a manually operated control lever adapted to provide a driving connection between the prime mover and variable speed transmission, a valve mechanically connected to said control lever, and adapted to initiate the cycle of operation when the control lever is shifted from a driving position to a neutral position, detent means adapted to latch the control lever in the neutral position, and a hydraulically operated device adapted to engage the detent means and to lock the control lever in the neutral position at the start of the cycle of operation.

13. A mechanism as set forth in claim 1 in which the starting means comprises a manually operated control lever adapted to provide a driving connection between the prime mover and variable speed transmission, a valve mechanically connected to said control lever, and adapted to initiate the cycle of operation when the control lever is shifted from a driving position to a neutral position, detent means adapted to latch the control lever in the neutral position, a hydraulically operated device adapted to engage the detent means and to lock the control lever in the neutral position at the start of the cycle of operation, a shot bolt adapted to lock the control lever in the neutral position, and hydraulic means for shifting the shot bolt to the locking position at the start of the cycle of operation.

14. A mechanism as set forth in claim 1 in which the hydraulic power means includes a manually operated shift control valve normally residing in an inactive position and a second manually operated valve interconnected with the hydraulic power means, the second valve in one position adapting the hydraulic power means to supply pressure for shifting the gears automatically when the starting means is operated to initiate the cycle of operation, the second valve in a second position adapted to supply hydraulic pressure to shift the gears only when the shift control valve is manually shifted to an active position.

15. A mechanism as set forth in claim 14 in which the manually operated shift control valve comprises a main valve spool and a control stem slidably mounted in the main valve spool and forming a push button adapted to be depressed manually, the control stem including ports adapted to supply hydraulic pressure to the main valve spool to shift the main valve spool to an active position by servo-motion, whereby the gears are shifted in response to manual depression of the control stem.

16. A mechanism as set forth in claim 1 in which the hydraulic power means includes a manually operated shift control valve normally residing in inactive position and a second manually operated valve interconnected with the hydraulic power means, the second valve in one position adapting the hydraulic power means to supply pressure for shifting the gears automatically when the starting means is operated to initiate the cycle of operation, the second valve in a second position adapted to supply hydraulic pressure to shift the gears only when the shift control valve is manually shifted to an active position, and interlock means interconnecting the starting means and shift control valve, the interlock means adapted to lock the starting means in a neutral position when the shift control valve is shifted to an active position.

17. A mechanism as set forth in claim 1 in which the starting means comprises a manually operated control lever adapted to provide a driving connection between the prime mover and the variable speed transmission and a valve mechanically connected to the control lever, the valve being interconnected with the hydraulic power means aand adapted to initiate the cycle of operation when the control lever is shifted from a driving position to a neutral position, whereby the prime mover is disconnected from the variable speed transmission when the cycle of operation is initiated.

18. A mechanism as set forth in claim 1 in which there is provided a clutch adapted to provide a driving connection between the prime mover and the variable speed transmission, a manually operated control lever connected to the clutch and having a neutral position in which the clutch is disengaged, and a valve mechanically connected to said control lever, the valve being interconnected with the hydraulic power means and adapted to initiate the cycle of operation when the control lever is shifted from a driving position to the neutral position disengaging the clutch, whereby the prime mover is disconnected from the variable speed transmission when the cycle of operation is initiated.

19. A mechanism as set forth in claim 1 in which there is provided a clutch between the rotating element and the variable speed transmission, a hydraulically operated device for shifting the clutch from an engaged position to a disengaged position, and a normally inactive manually operated valve interconnecting the hydraulic power means and hydraulically operated device and adapted to shift said clutch to a disengaged position upon being shifted to an active position, whereby the rotating element is rotatable independently of the variable speed transmission.

20. A mechanism as set forth in claim 1 in which there is provided a hydraulically actuated clutch between the rotating element and the variable speed transmission adapted to be shifted from an engaged position to a disengaged position, a manually operated valve interconnecting the hydraulic power means and clutch, the valve normally residing in an inactive position and adapted to shift said clutch to a disengaged position upon being shifted to an active position, thereby adapting the rotating element to be rotated independently of the variable speed transmission, and a hydraulic interlock adapted to lock the starting means in a neutral position when the valve is shifted to the active position.

21. A mechanism as set forth in claim 1 in which the sequence control means comprises a cylinder, a piston slidably mounted in said cylinder, and spring means urging the piston toward one end of the cylinder, said cylinder having at least one port interconnected with the hydraulic power means, said cylinder having a second port formed in an end portion thereof opposite said spring means, said starting means being hydraulically interconnected with said second port and adapted to supply hydraulic pressure thereto, thereby to shift said piston counter to said spring means when the cycle of operation is initiated, whereby said piston uncovers said port, adapting the hydraulic power means to actuate the brake, the lock, the reciprocator means and the gear shifting means upon initiation of the cycle of operation.

22. A mechanism as set forth in claim 1 in which the sequence control means comprises a cylinder, a piston slidably mounted in said cylinder, spring means urging the piston toward one end of the cylinder, said cylinder having at least one port interconnected with the hydraulic power means, said starting means being hydraulically interconnected with one end of the cylinder and adapted to supply hydraulic pressure to the cylinder, thereby to shift said piston counter to the spring means when the cycle of operation is initiated, and metering means connected to the cylinder and adapted to control the rate of motion of said piston, whereby said piston uncovers said port, adapting the hydraulic power means to actuate the brake, the lock, the reciprocator means and the gear shifting means upon initiation of the cycle of operation.

23. A mechanism as set forth in claim 1 in which the reciprocator means is provided with a clutch adapted to provide a driving connection with the transmission, and means for engaging and disengaging the clutch, whereby the clutch is engaged to oscillate the gears when said reciprocator means is energized and is disengaged after the gear shifting means are actuated to shift the selected gears into mesh with one another.

24. A mechanism as set forth in claim 1 in which the reciprocator means is provided with a clutch adapted to provide a driving connection with the transmission, and a hydraulically operated device adapted to actuate the clutch, the hydraulic power means being interconnected with said hydraulically operated device for engaging and disengaging said clutch, whereby the clutch is engaged to oscillate the gears when said reciprocator means is energized and is disengaged after the gear shifting means are actuated to shift the selected gears into mesh with one another.

25. A mechanism as set forth in claim 1 in which the reciprocator means comprises a hydraulic reciprocator motor having a reciprocating element, a normally disengaged clutch adapted to couple the reciprocating element to said gear train, and means for supplying hydraulic pressure to said motor for energizing the motor, thereby to oscillate the gears of the transmission to facilitate meshing of the teeth thereof while said gears are being shifted.

26. A reciprocator as set forth in claim 25 in which the clutch is provided with a hydraulic piston adapted to engage the clutch, combined with means for supplying hydraulic pressure to the piston for engaging the clutch when the reciprocator motor is energized.

27. A reciprocator as set forth in claim 25 in which the reciprocator comprises a hydraulic cylinder, a piston mounted for reciprocation within the cylinder, a rack connected to the piston, and a pinion meshing with the rack, whereby reciprocation of the piston and rack is transmitted to the speed change gears for imparting oscillating motion to the gears.

28. A reciprocator as set forth in claim 26 in which the reciprocator motor is provided with a shiftable valve, and in which the piston includes means adapted to shift the valve alternately to two positions in response to reciprocation of the piston, the valve being adapted to supply and exhaust hydraulic pressure alternately relative to the opposite ends of the cylinder, thereby to provide sustained reciprocation of the piston and rack.

References Cited in the file of this patent

UNITED STATES PATENTS 2,782,891    Sassen _____ Feb. 26, 1957